(12) United States Patent
Ishikawa et al.

(10) Patent No.: US 7,824,817 B2
(45) Date of Patent: Nov. 2, 2010

(54) FUEL CELL

(75) Inventors: Eri Ishikawa, Utsunomiya (JP); Seiji Sugiura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/978,844

(22) Filed: Oct. 30, 2007

(65) Prior Publication Data
US 2008/0113248 A1  May 15, 2008

(30) Foreign Application Priority Data
Nov. 9, 2006  (JP) .............................. 2006-304165

(51) Int. Cl.
*H01M 2/14* (2006.01)
*H01M 8/02* (2006.01)
*H01M 8/04* (2006.01)

(52) U.S. Cl. .................. 429/456; 429/457; 429/545; 429/512; 429/513

(58) Field of Classification Search .................. 429/34, 429/39, 35, 38
See application file for complete search history.

(56) References Cited

U.S. PATENT DOCUMENTS 5,472,801 A * 12/1995 Mattejat et al. ............... 429/39
2007/0065712 A1 * 3/2007 Wada et al. .................... 429/44
2007/0298308 A1 * 12/2007 Yamamoto et al. ........... 429/34

FOREIGN PATENT DOCUMENTS

| CA | 2490011 A1 * | 9/2004 |
|----|----|----|
| CA | 2490011 A1 | 6/2005 |
| CA | 2540773 A1 * | 3/2006 |
| CA | 2540773 A1 | 9/2006 |
| JP | 06-218275 A1 | 8/1994 |

OTHER PUBLICATIONS

Canadian Office Action for Application No. 2,608,616, dated Sep. 24, 2009.

* cited by examiner

*Primary Examiner*—Dah-Wei Yuan
*Assistant Examiner*—Angela J. Martin
(74) *Attorney, Agent, or Firm*—Lahive & Cockfield, LLP; Anthony A. Laurentano, Esq.

(57) ABSTRACT

A power generation cell of a fuel cell includes a membrane electrode assembly, and a first separator and a second separator sandwiching the membrane electrode assembly. First supply holes, first discharge holes, second supply holes and second discharge holes extend through the membrane electrode assembly in a stacking direction. The first supply holes connect a fuel gas supply passage and a fuel gas flow field. The first discharge holes connect a fuel gas discharge passage and the fuel gas flow field. The second supply holes connect an oxygen-containing gas supply passage and an oxygen-containing gas flow field. The second discharge holes connect an oxygen-containing gas discharge passage and the oxygen-containing gas flow field.

9 Claims, 22 Drawing Sheets

FUEL CELL

BACKGROUND OF THE INVENTION

1. Field of the Invention

The present invention relates to a fuel cell formed by sandwiching an electrolyte electrode assembly between a pair of separators. The electrolyte electrode assembly includes a pair of electrodes and an electrolyte interposed between the electrodes. Reactant gas flow fields are formed along electrode surfaces, and reactant gas passages for flowing reactant gases through the fuel cell in the stacking direction.

2. Description of the Related Art

For example, a polymer electrolyte fuel cell employs a membrane electrode assembly (electrolyte electrode assembly) which includes an anode, a cathode, and an electrolyte membrane interposed between the anode and the cathode. Each of the anode and the cathode comprises an electrode catalyst layer and porous carbon. The electrolyte membrane is a solid polymer ion exchange membrane. The membrane electrode assembly and separators (bipolar plates) sandwiching the membrane electrode assembly make up a unit of a power generation cell for generating electricity. In use, normally, a predetermined number of power generation cells are stacked together to form a fuel cell stack.

In general, the fuel cell has so called internal manifold structure in which supply passages and discharge passages extend through the separators in the stacking direction. The fuel gas, the oxygen-containing gas, and the coolant flow from the respective supply passages to a fuel gas flow field, an oxygen-containing gas flow field, and a coolant flow field, and then, the fuel gas, the oxygen-containing gas, and the coolant are discharged into the respective discharge passages.

For example, in a process control apparatus disclosed in Japanese Laid-Open Patent Publication No. 6-218275, as shown in FIG. 22, two plates 1a, 1b are overlapped with each other, and stacked alternately with a unit 2. The unit 2 includes an anode 2b, a cathode 2c, and an MEA 2a interposed between the anode 2b and the cathode 2c, and these components are sandwiched between a pair of contact plates 2d.

A first chamber 3a is formed between the plate 1a and the unit 2, a second chamber 3b is formed between the plate 1b and the unit 2, and a third chamber 3c is formed between the plates 1a, 1b. A passage 5 extends through ends of the plates 1a, 1 with packings 4.

The passage 5 is connected to, e.g., the second chamber 3b through a flow field 6 formed between the plates 1a, 1b. Though not shown, two other passages extending in the stacking direction are provided, and the two passages are connected to the first chamber 3a and the third chamber 3c through flow fields between the plates 1a, 1b.

In the conventional technique, the plate 1b has holes 7 to form the flow field 6 connecting the passage 5 extending in the stacking direction to the second chamber 3b. Likewise, the plates 1a, 1b have holes connecting the two other holes to the first chamber 3a and the third chamber 3c.

However, as described above, since the holes 7 or the like are formed in the plates 1a, 1b as separators, many steps are required for fabricating the separators, and the structure of the separators is complicated. Further, in the case where metal separators are used, since metal portions around the holes are exposed, insulating processing needs to be applied to the areas around the holes. Thus, a large number of steps are required for fabricating the metal separators uneconomically.

SUMMARY OF THE INVENTION

A main object of the present invention is to provide a fuel cell in which it is possible to simplify separator structure effectively, and reduce the number of steps for fabricating separators economically.

According to the present invention, a fuel cell comprises an electrolyte electrode assembly and a pair of separator sandwiching the electrolyte electrode assembly. The electrolyte electrode assembly includes a pair of electrodes, and an electrolyte interposed between the electrodes. A reactant gas flow field extends along an electrode surface between the electrolyte electrode assembly and each of the separators. A reactant gas supply passage extends through the separators in a stacking direction. A hole extends through the electrolyte electrode assembly in the stacking direction for connecting the reactant gas supply passage and the reactant gas flow field.

According to another aspect of the present invention, a fuel cell comprises an electrolyte electrode assembly and a first separator and a second separator sandwiching the electrolyte electrode assembly. The electrolyte electrode assembly includes an anode, a cathode, and an electrolyte interposed between the anode and the cathode. A fuel gas flow field extends along a surface of the anode. An oxygen-containing gas flow field extends along a surface of the cathode. A fuel gas passage for flowing the fuel gas through the first separator and the second separator in the stacking direction, and an oxygen-containing gas passage for flowing the oxygen-containing gas through the first separator and the second separator in a stacking direction.

A first hole extends through electrolyte electrode assembly in the stacking direction for connecting the fuel gas passage from a cathode side to the fuel gas flow field, and a second hole extends through the electrolyte electrode assembly in the stacking direction for connecting the oxygen-containing gas passage from an anode side to the oxygen-containing gas flow field.

In the present invention, the electrolyte electrode assembly has the hole extending in the stacking direction for connecting the reactant gas passage and the reactant gas flow field. In the structure, no holes for introducing the reactant gases into the electrode surfaces are required in the pair of separators sandwiching the electrolyte electrode assembly. Thus, the number of steps of fabricating the separators is reduced, and the separators can be obtained economically.

Further, in the present invention, the electrolyte electrode assembly has the first hole connecting the fuel gas passage from the cathode side to the fuel gas flow field, and the second hole connecting the oxygen-containing gas passage from the anode side to the oxygen-containing gas flow field. Thus, no first and second holes need to be formed in the first and second separators. Structure of the first and second separators is simplified, and the first and second separators can be produced at low cost economically.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
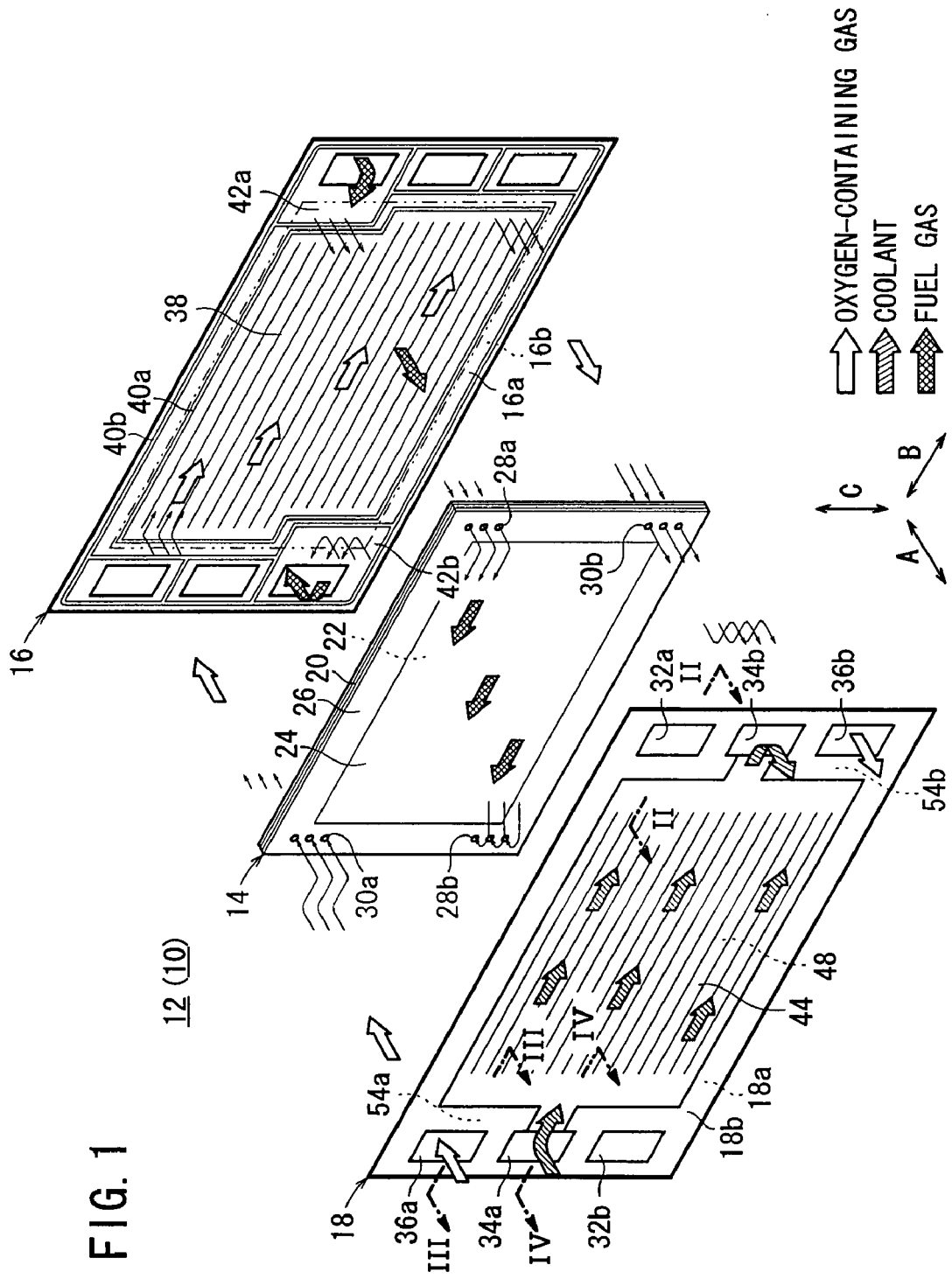
FIG. 1 is an exploded perspective view showing a power generation cell of a fuel cell according to a first embodiment of the present invention.
Figure 2:
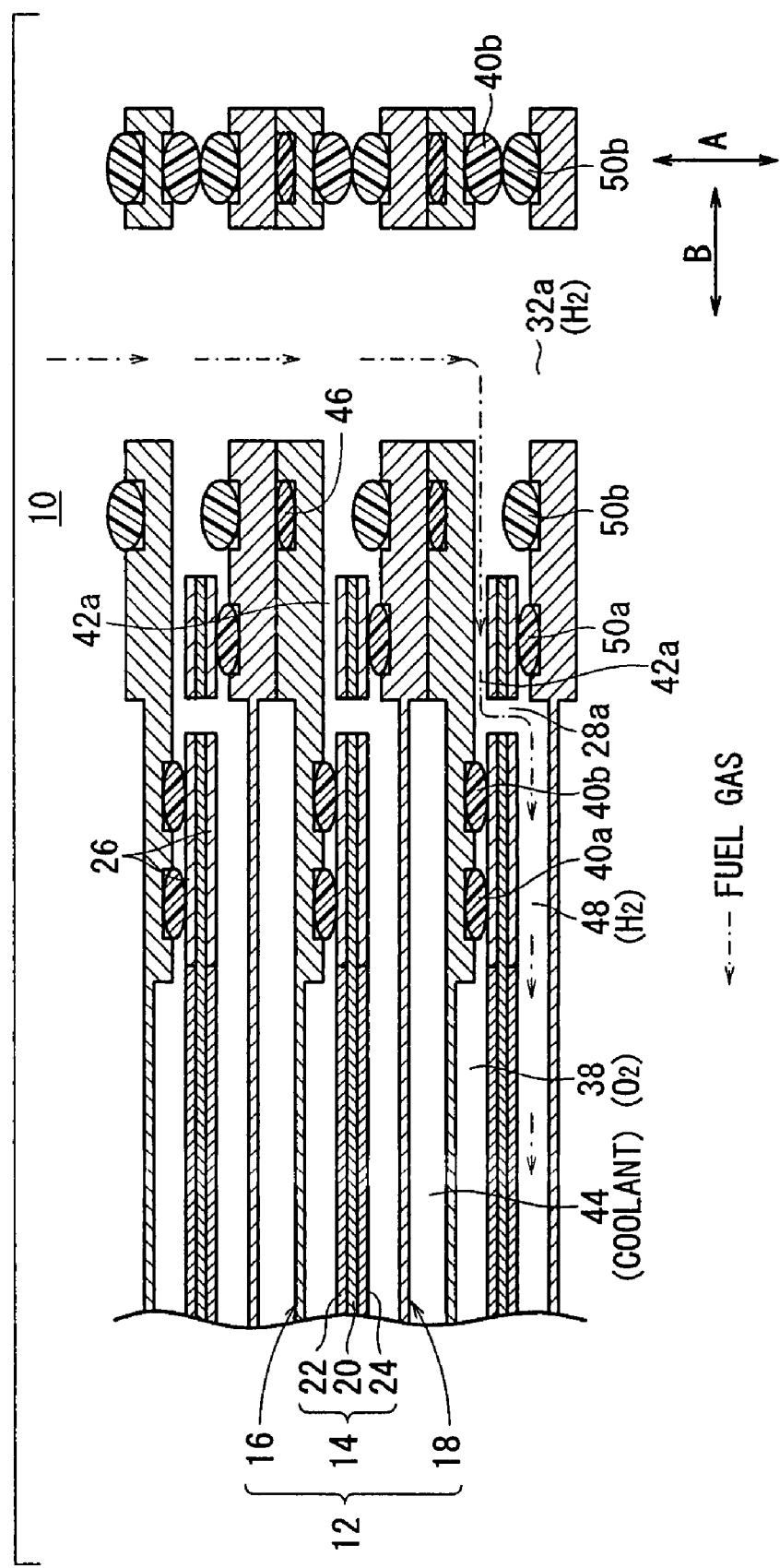
FIG. 2 is a cross sectional view showing the fuel cell taken along a line II-II in FIG. 1.
Figure 3:
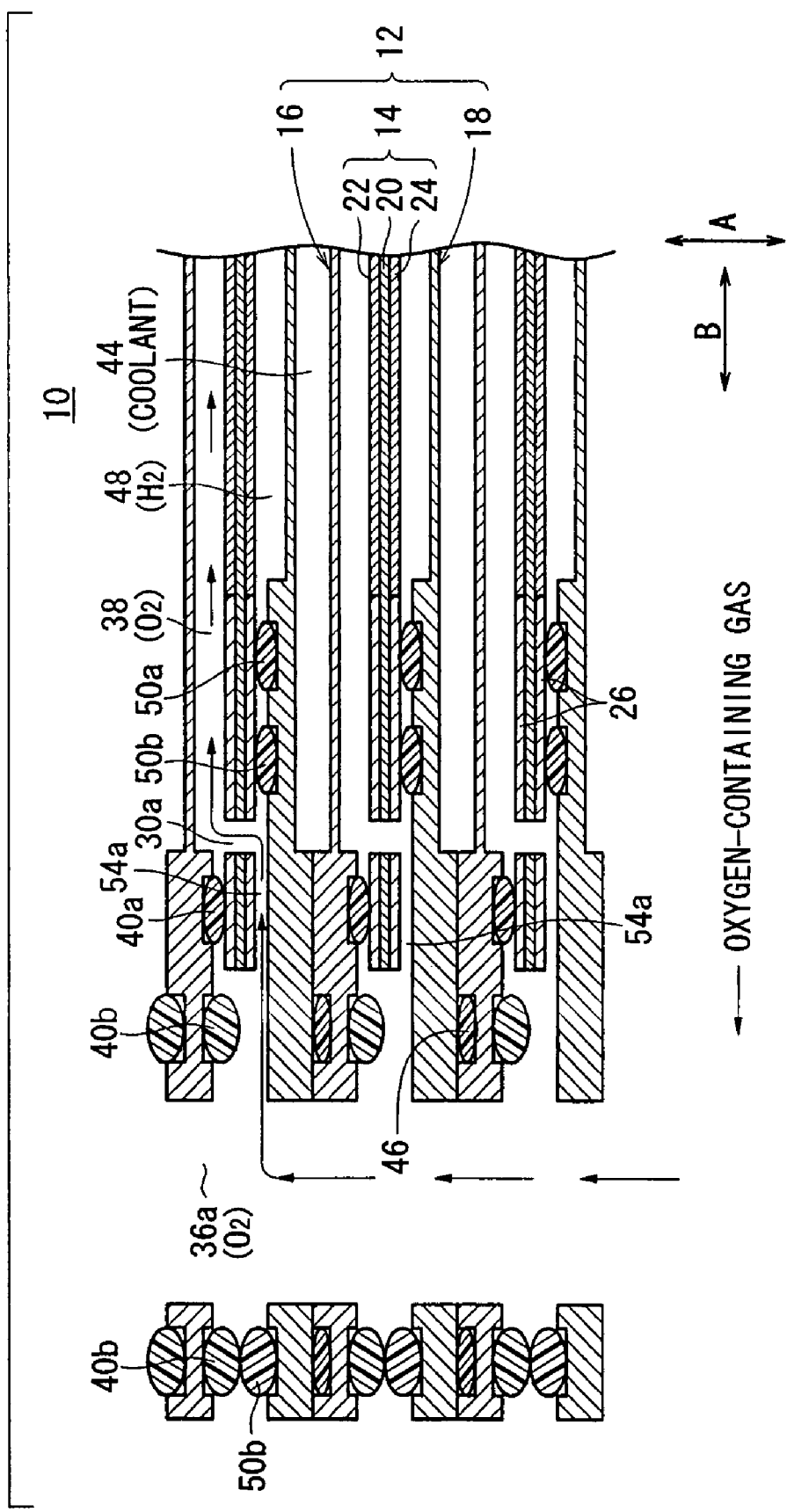
FIG. 3 is a cross sectional view showing the fuel cell taken along a line III-III in FIG. 1.
Figure 4:
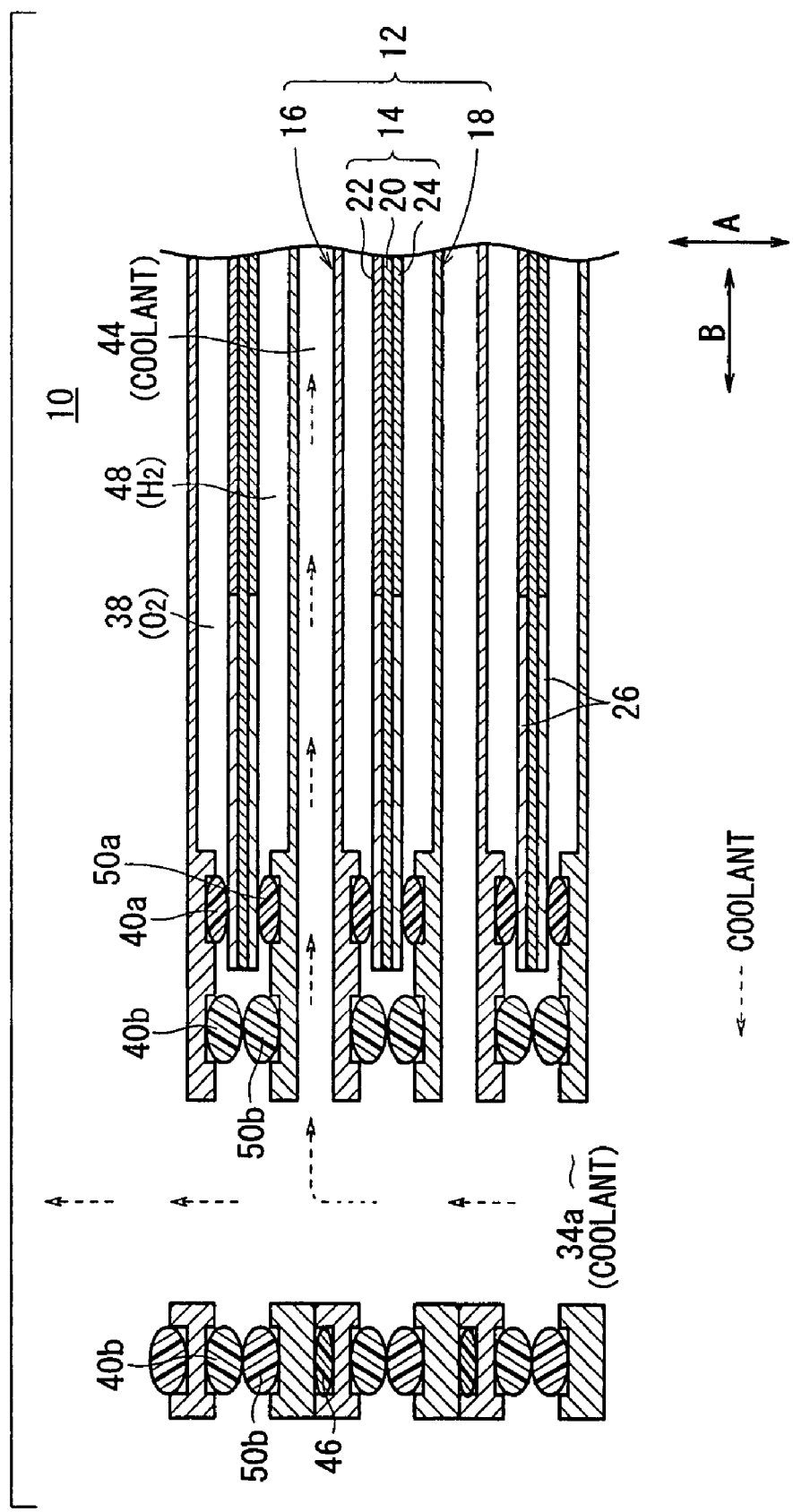
FIG. 4 is a cross sectional view showing the fuel cell taken along a line IV-IV in FIG. 1.

FIG. 1 is an exploded perspective view showing a power generation cell 12 of a fuel cell 10 according to a first embodiment of the present invention. FIG. 2 is a cross sectional view showing the fuel cell 10 taken along a line II-II in FIG. 1. FIG. 3 is a cross sectional view showing the fuel cell 10 taken along a line III-III in FIG. 1. FIG. 4 is a cross sectional view showing the fuel cell 10 taken along a line IV-IV in FIG. 1.

The fuel cell 10 is formed by stacking a plurality of power generation cells 12 in a direction indicated by an arrow A. As shown in FIG. 1, each of the power generation cells 12 includes a membrane electrode assembly (electrolyte electrode assembly) 14 and a first separator 16 and a second separator 18 sandwiching the membrane electrode assembly 14. For example, the first separator 16 and the second separator 18 are carbon separators or metal separators, and have a rectangular shape.

The membrane electrode assembly 14 includes a cathode 22, an anode 24, and a solid polymer electrolyte membrane (electrolyte) 20 interposed between the cathode 22 and the anode 24. The solid polymer electrolyte membrane 20 is formed by impregnating a thin membrane of perfluorosulfonic acid with water, for example. Each of the cathode 22 and the anode 24 has a gas diffusion layer (not shown) formed of a carbon paper or the like, and an electrode catalyst layer (not shown) formed of platinum alloy supported on porous carbon particles. The carbon particles are deposited uniformly on the surface of the gas diffusion layer.

In the membrane electrode assembly 14, the surface area of the solid polymer electrolyte membrane 20 is larger than the surface area of the cathode 22, and the surface area of the anode 24. A resin frame 26 is provided on both surfaces of the solid polymer electrolyte membrane 20, along four sides protruding from the cathode 22 and the anode 24. The resin frame 26 is formed by impregnating both surfaces of the outer edge of solid polymer electrolyte membrane 20 with resin material.

At upper positions of one end of the resin frame 26 in a direction indicated by an arrow B, a plurality of first (fuel gas) supply holes 28a are formed. At lower positions of the other end of the resin frame 26 in the direction indicated by the arrow B, a plurality of first (fuel gas) discharge holes 28b are formed. At upper positions of the other end of the resin frame 26 in the direction indicated by the arrow B, a plurality of second (oxygen-containing gas) supply holes 30a are formed. At lower positions of the one end of the resin frame 26 in the direction indicated by the arrow B, a plurality of second (oxygen-containing gas) discharge holes 30b are formed.

At one end of the first separator 16 and the second separator 18 in the direction indicated by the arrow B, a fuel gas supply passage 32a for supplying a fuel gas such as a hydrogen-containing gas, a coolant discharge passage 34b for discharging a coolant, and an oxygen-containing gas discharge passage 36b for discharging an oxygen-containing gas are arranged vertically in a direction indicated by an arrow C. The fuel gas supply passage 32a, the coolant discharge passage 34b, and the oxygen-containing gas discharge passage 36b extend through the first separator 16 and the second separator 18 in the stacking direction indicated by the arrow A.

At the other end of the first separator 16 and the second separator 18 in the direction indicated by the arrow B, an oxygen-containing gas supply passage 36a for supplying the oxygen-containing gas, a coolant supply passage 34a for supplying the coolant, and a fuel gas discharge passage 32b for discharging the fuel gas are arranged in the direction indicated by the arrow C. The fuel gas and the oxygen-containing gas flow in opposite directions in a counterflow manner. For example, the coolant and the oxygen-containing gas flow in parallel.

The first separator 16 has an oxygen-containing gas flow field 38 on a surface 16a facing the membrane electrode assembly 14. For example, an inner seal member 40a such as a gasket and an outer seal member 40b outside the inner seal member 40a are provided on the surface 16a of the membrane electrode assembly 14.

The inner seal member 40a is provided around the oxygen-containing gas flow field 38, and the outer seal member 40b is provided around the fuel gas supply passage 32a, the coolant discharge passage 34b, the oxygen-containing gas supply passage 36a, the oxygen-containing gas discharge passage 36b, the coolant supply passage 34a, and the fuel gas discharge passage 32b.

Portions of the outer seal member 40b around the fuel gas supply passage 32a and the fuel gas discharge passage 32b are extended inwardly to form an inlet connection area 42a and an outlet connection area 42b. The inlet connection area 42a is connected to the first supply holes 28a of the electrolyte electrode assembly 14, and the outlet connection area 42b is connected to the first discharge holes 28b of the membrane electrode assembly 14.

Figure 5:
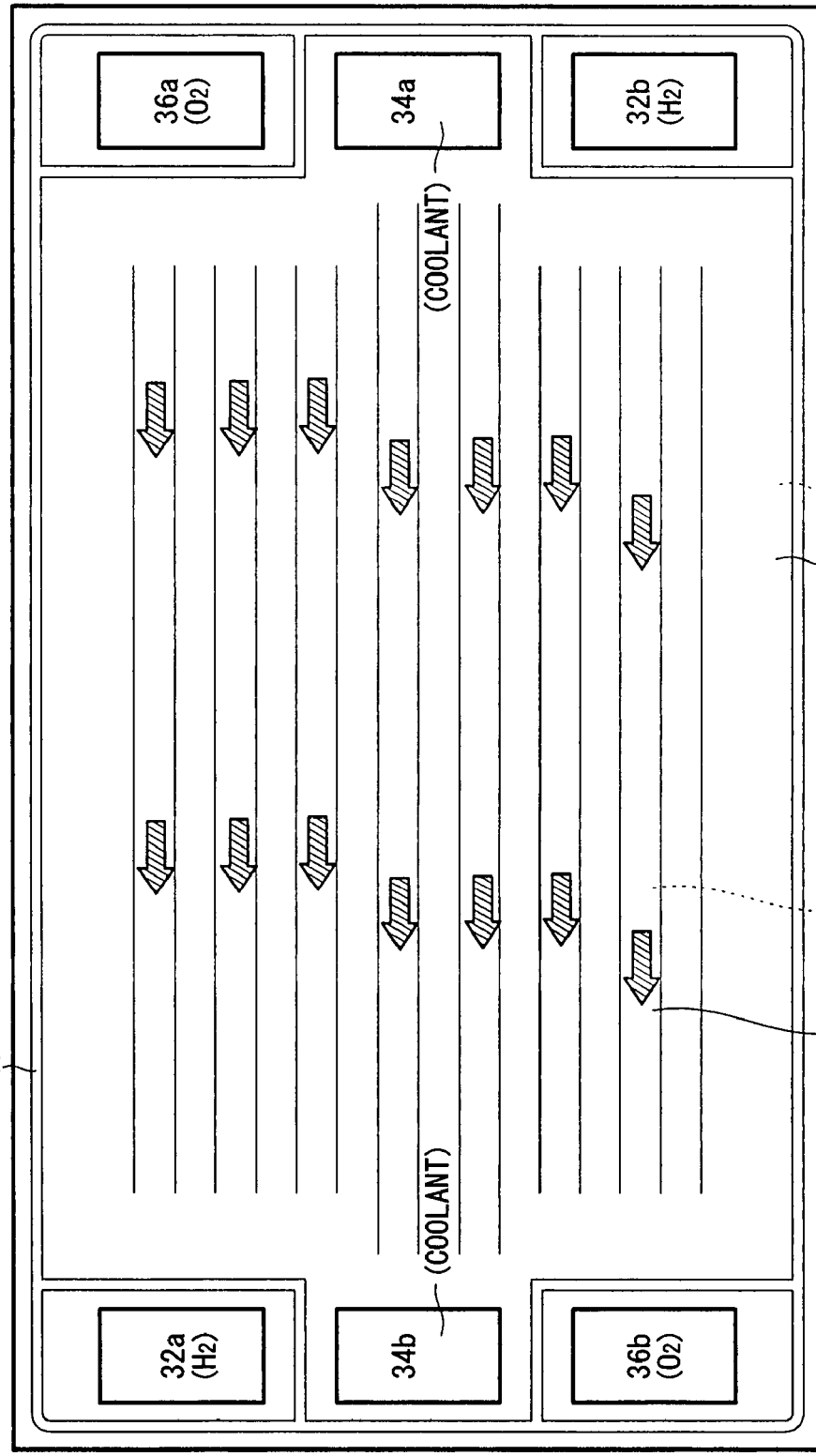
FIG. 5 is a front view showing a first separator of the power generation cell.

As shown in FIG. 5, a coolant flow field 44 is formed on a surface 16b of the first separator 16. The coolant flow field 44 is connected to the coolant supply passage 34a and the coolant discharge passage 34b. A seal member 46 is provided on the surface 16b such that the coolant flow field 44 is connected only to the coolant supply passage 34a and the coolant discharge passage 34b.

Figure 6:
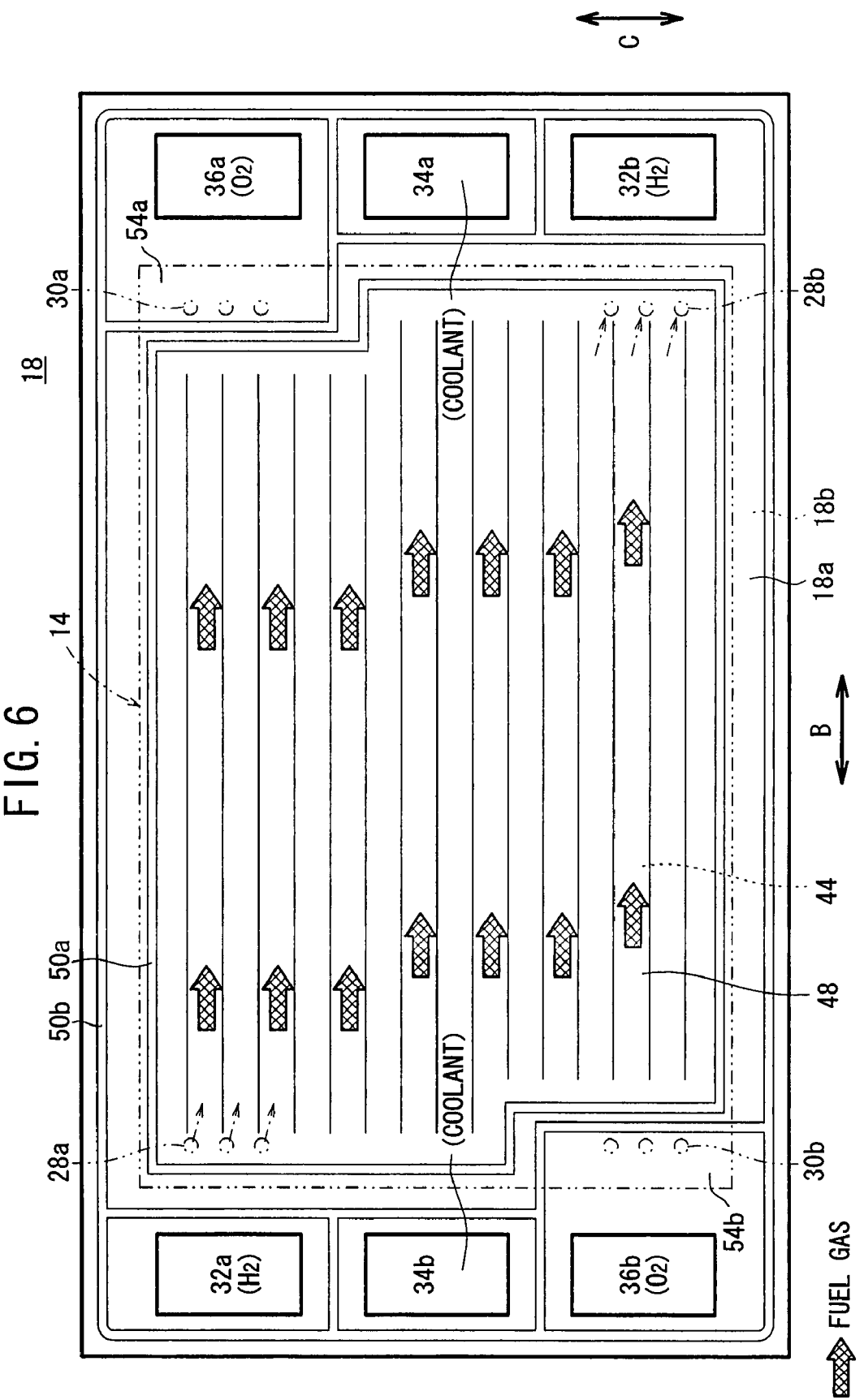
FIG. 6 is a front view showing a second separator of the power generation cell.

As shown in FIG. 6, the second separator 18 has a fuel gas flow field 48 on a surface 18a facing the membrane electrode assembly 14. An inner seal member 50a is provided around the fuel gas flow field 48, and an outer seal member 50b is provided outside the inner seal member 50a.

Portions of the outer seal member 50b around the oxygen-containing gas supply passage 36a and the oxygen-containing gas discharge passage 36b are extended inwardly to form an inlet connection area 54a and an outlet connection area 54b. The inlet connection area 54a is connected to the second supply holes 30a of the membrane electrode assembly 14, and the outlet connection area 54b is connected to the second discharge holes 30b of the membrane electrode assembly 14.

The inner seal members 40a, 50a, the outer seal members 40b, 50b, and the seal member 46 are made of the same material such as an EPDM rubber (Ethylene Propylene Diene Monomer), a silicone rubber, a nitrile rubber, or an acrylic rubber.

Operation of the fuel cell 10 will be described.

As shown in FIG. 1, a fuel gas such as a hydrogen-containing gas is supplied to the fuel gas supply passage 32a, an oxygen-containing gas is supplied to the oxygen-containing gas supply passage 36a. Further, a coolant such as pure water, or an ethylene glycol is supplied to the coolant supply passages 34a.

The fuel gas supplied to the fuel gas supply passage 32a flows into the inlet connection area 42a of the first separator 16. Then, the fuel gas flows through the inlet supply holes 28a extending in the stacking direction from the cathode 22 side. The fuel gas is supplied to the fuel gas flow field 48 of the second separator 18 (see FIG. 2).

After the fuel gas flows along the fuel gas flow field 48 in the direction indicated by the arrow B, the fuel gas flows through the first discharge holes 28b, and passes the membrane electrode assembly 14. Further, the fuel gas flows through the outlet connection area 42b, and then, the fuel gas is discharged along the fuel gas discharge passage 32b.

The oxygen-containing gas supplied to the oxygen-containing gas supply passage 36a flows into the inlet connection area 54a on the surface 18a of the second separator 18, i.e., on the anode 24 side. Then, the oxygen-containing gas flows through the second supply holes 30a connected to the inlet connection area 54a in the stacking direction, and the oxygen-containing gas is supplied to the oxygen-containing gas flow field 38 (see FIG. 3).

After the oxygen-containing gas flows in the direction indicated by the arrow B, the oxygen-containing gas flows through the second discharge holes 30b of the membrane electrode assembly 14. Then, the oxygen-containing gas flows into the outlet connection area 54b of the second separator 18, and is discharged along the oxygen-containing gas discharge passage 36b.

Thus, in the membrane electrode assembly 14, the fuel gas supplied to the anode 24 and the oxygen-containing gas supplied to the cathode 22 are consumed in the electrochemical reactions at catalyst layers of the anode 24 and the cathode 22 for generating electricity.

Further, the coolant supplied to the coolant supply passage 34a flows into a coolant flow field 44 between the first separator 16 and the second separator (see FIG. 4). Thus, after the coolant flows in the direction indicated by the arrow B to cool the membrane electrode assembly 14, the coolant is discharged into the coolant discharge passage 34b.

In the first embodiment, the membrane electrode assembly 14 has the first supply holes 28a and the first discharge holes 28b connecting the fuel gas supply passage 32a and the fuel gas discharge passage 32b from the cathode 22 side to the fuel gas flow field 48. Further, the membrane electrode assembly 14 has the second supply holes 30a and the second discharge holes 30b connecting the oxygen-containing gas supply passage 36a and the oxygen-containing gas discharge passage 36b from the anode 24 side to the oxygen-containing gas flow field 38.

Thus, no holes corresponding to the first supply holes 28a, the first discharge holes 28b, the second supply holes 30a, and the second discharge holes 30b for passing the fuel gas and the oxygen-containing gas therethrough are required in the first separator 16 and the second separator 18. Thus, structure of the first separator 16 and the second separator 18 is simplified effectively, and the number of steps of fabricating the first separator 16 and the second separator 18 is reduced economically. In particular, in the case where the first separator 16 and the second separator 18 are metal separators, no insulating processing is required for metal exposed by formation of the holes in the metal separators. Thus, the number of steps of producing the metal separators is reduced significantly and economically.

Figure 7:
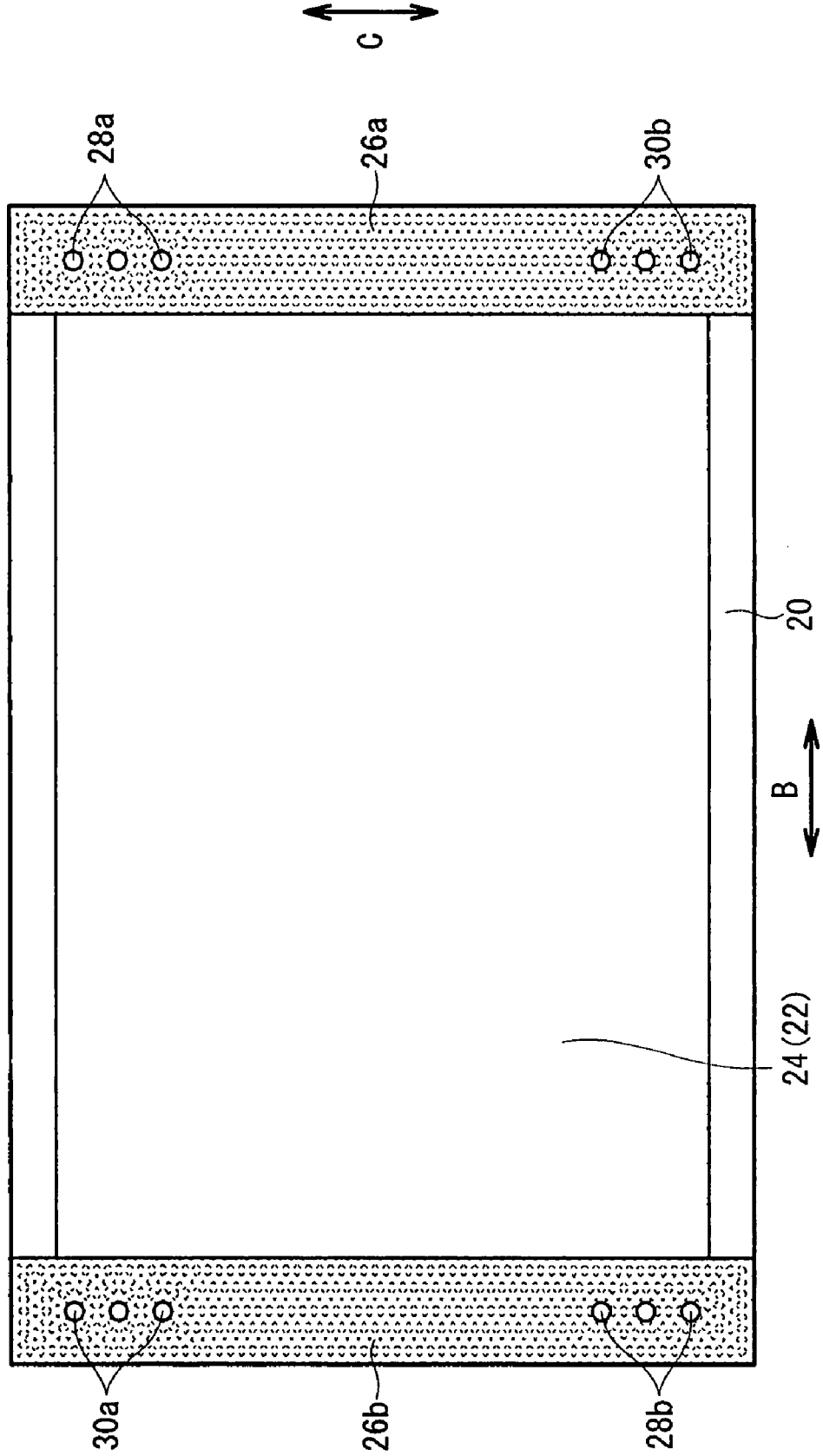
FIG. 7 is a front view showing a membrane electrode assembly of a fuel cell according to a second embodiment of the present invention.
Figure 8:
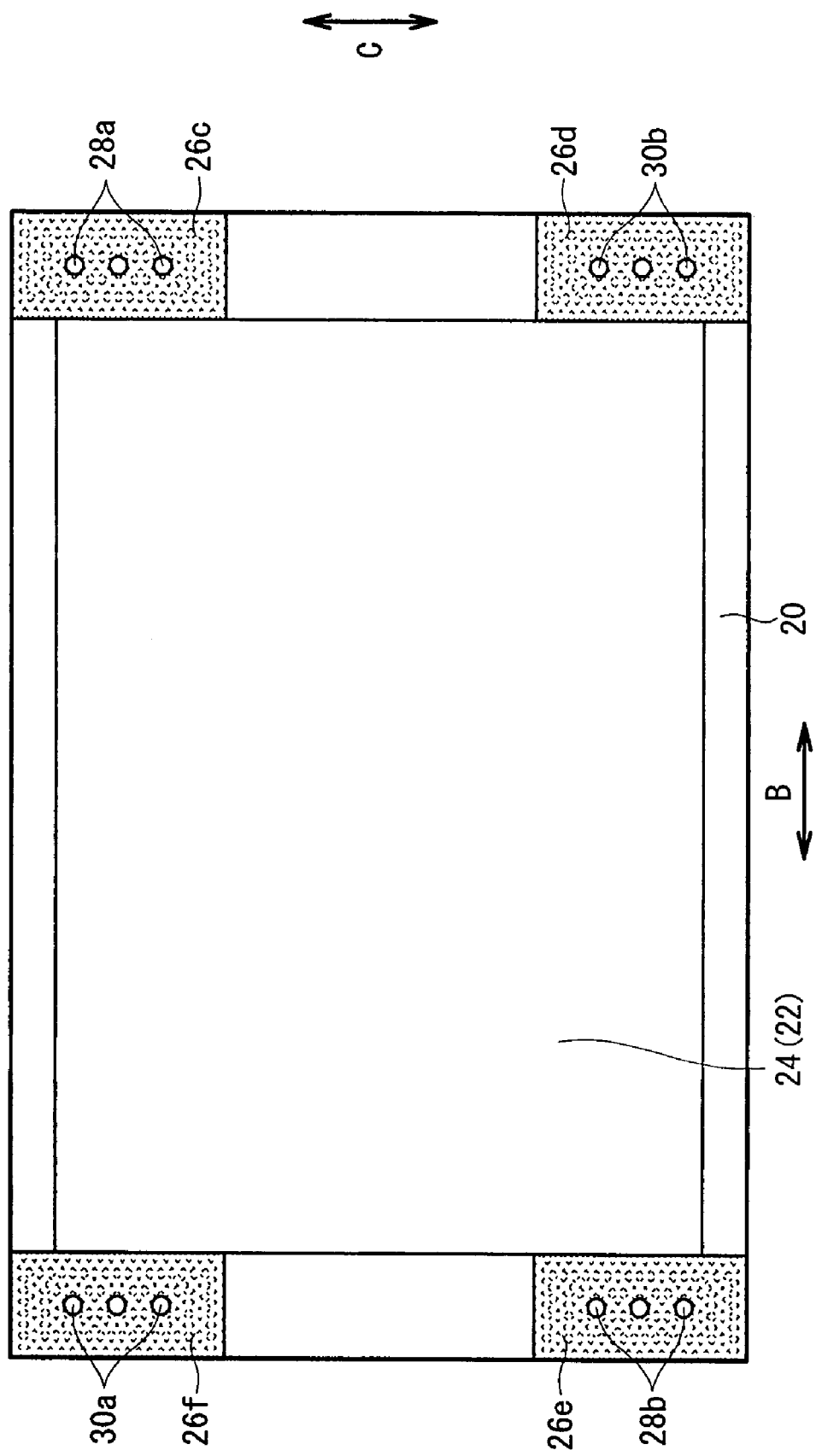
FIG. 8 is a front view showing a membrane electrode assembly of a fuel cell according to a third embodiment of the present invention.

FIG. 7 is a front view showing a membrane electrode assembly 14a of a fuel cell according to a second embodiment of the present invention. FIG. 8 is a front view showing a membrane electrode assembly 14b of a fuel cell according to a third embodiment of the present invention.

The constituent elements that are identical to those of the fuel cell 10 according to the first embodiment are labeled with the same reference numeral, and description thereof will be omitted. Further, also in fourth to eighth embodiments as descried later, the constituent elements that are identical to those of the fuel cell 10 according to the first embodiment are labeled with the same reference numeral, and description thereof will be omitted.

As shown in FIG. 7, the membrane electrode assembly 14a has resin frames 26a, 26b covering opposite ends of the solid polymer electrolyte membrane 20 in the direction indicated by the arrow B. The resin frame 26a has the first supply holes 28a and the second discharge holes 30b, and the resin frame 26b has the second supply holes 30a and the first discharge holes 28b.

As shown in FIG. 8, the membrane electrode assembly 14b has resin frames 26c, 26d, 26e, and 26f at four corners of the solid polymer electrolyte membrane 20. The resin frame 26c has the first supply holes 28a, the resin frame 26d has the second discharge holes 30b, the resin frame 26e has the first discharge holes 28b, and the resin frame 26f has the second supply holes 30a.

In the membrane electrolyte assemblies 14a, 14b, the same advantages as in the case of the first membrane electrode assembly 14 are obtained. The resin frames 26a to 26f are formed by impregnating both surface of the solid polymer electrolyte membrane 20 with resin material. However, the present invention is not limited in this respect. For example, the resin frames 26a to 26f may be formed by impregnating gas diffusion layers (not shown) of the cathode 22 and the anode 24 with resin material.

Figure 9:
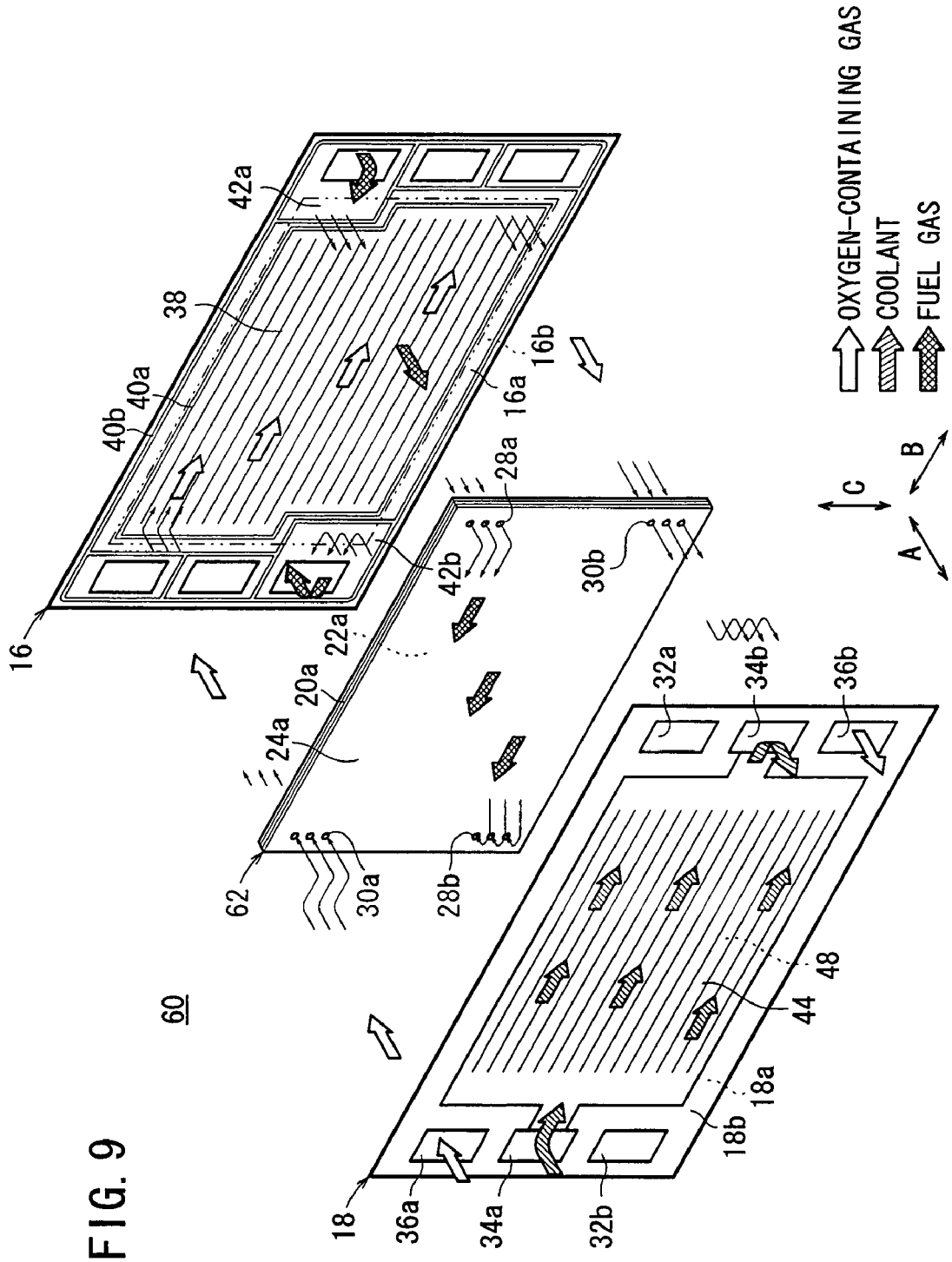
FIG. 9 is an exploded perspective view showing a power generation cell according to a fourth embodiment of the present invention.

FIG. 9 is an exploded perspective view showing a power generation cell 60 of a fuel cell according to a fourth embodiment of the present invention.

The power generation cell 60 has a membrane electrode assembly 62 including an anode 24a, a cathode 22a, and a solid polymer electrolyte membrane 20a interposed between the anode 24a and the cathode 22a. The surface area of the solid polymer electrolyte membrane 20a is the same as the surface area of the anode 24a and the surface area of the cathode 22a.

The first supply holes 28a, the first discharge holes 28b, the second supply holes 30a, and the second discharge holes 30b are formed at four corners of the membrane electrode assembly 62. The first supply holes 28a, the first discharge holes 28b, the second supply holes 30a, and the second discharge holes 30b extend through the solid polymer electrolyte membrane 20a, and the cathode 22a and the anode 24a sandwiching the solid polymer electrolyte membrane 20a.

In the fourth embodiment, the same advantages as in the cases of the first to third embodiments can be obtained.

Figure 10:
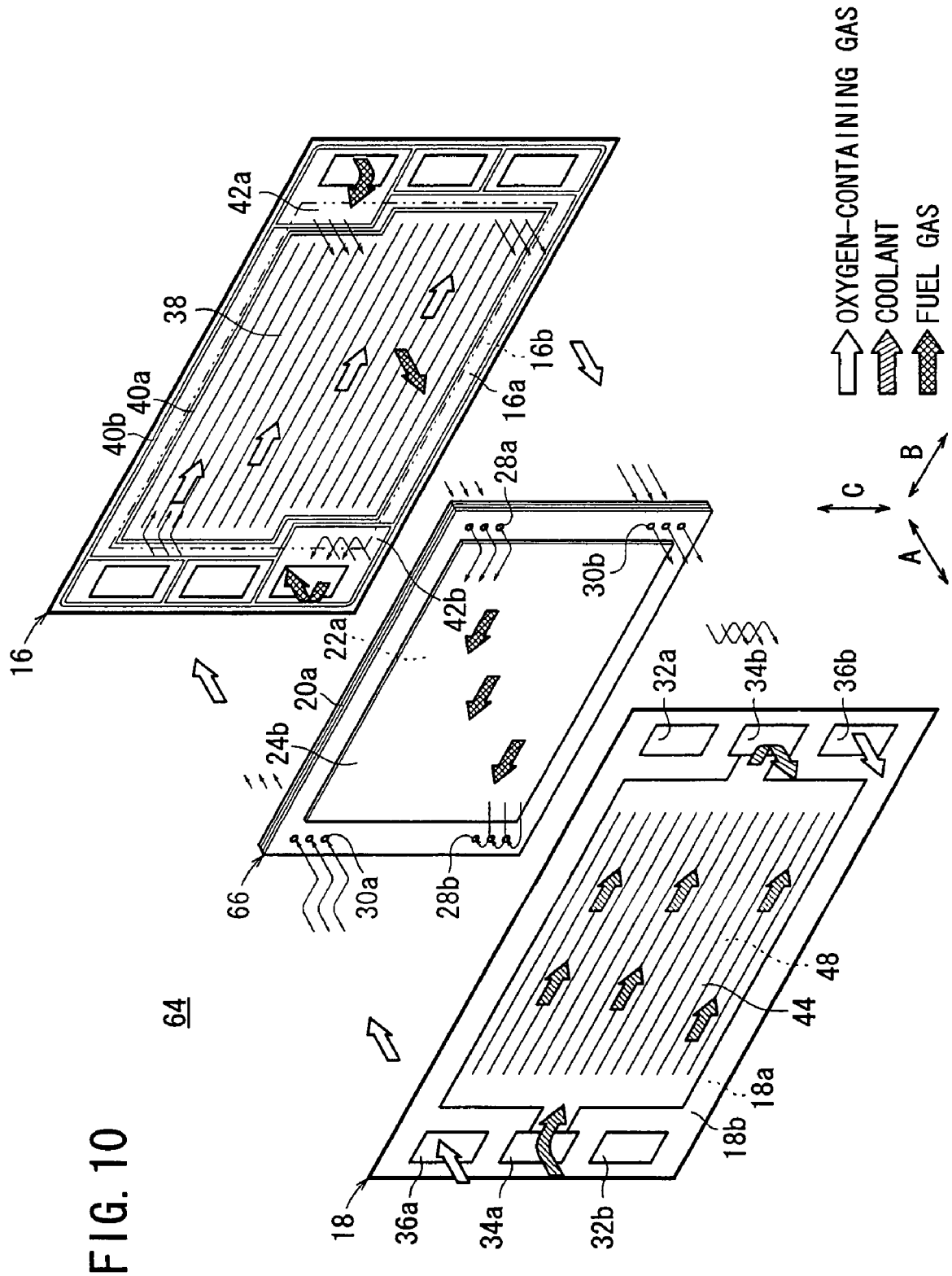
FIG. 10 is an exploded perspective view showing a power generation cell of a fuel cell according to a fifth embodiment of the preset invention.

FIG. 10 is an exploded perspective view showing a power generation cell 64 of a fuel cell according to a fifth embodiment of the present invention.

The power generation cell 64 includes a membrane electrode assembly 66 sandwiched between the first separator 16 and the second separator 18. In the membrane electrode assembly 66, the surface area of the solid polymer electrolyte membrane 20a is the same as the surface area of the cathode 22a, and the surface area of the anode 24b is smaller than the surface area of the cathode 22a.

The first supply holes 28a, the first discharge holes 28b, the second supply holes 30a, and the second discharge holes 30b are formed in the solid polymer electrolyte membrane 20a and the cathode 22a.

In the fifth embodiment, the same advantages as in the cases of the first to fourth embodiments can be obtained.

Figure 11:
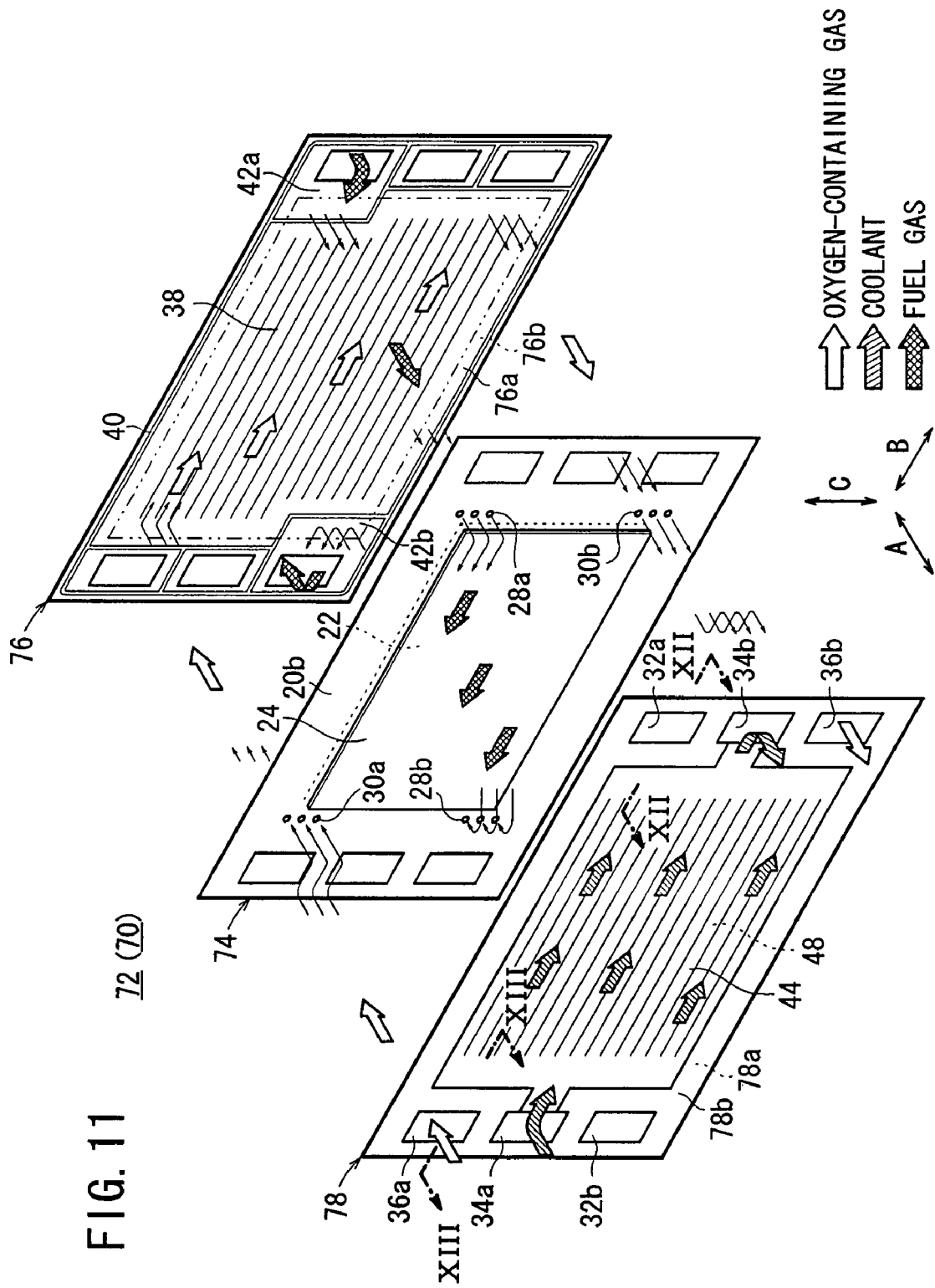
FIG. 11 is an exploded perspective view showing a power generation cell of a fuel cell according to a sixth embodiment of the present invention.
Figure 12:
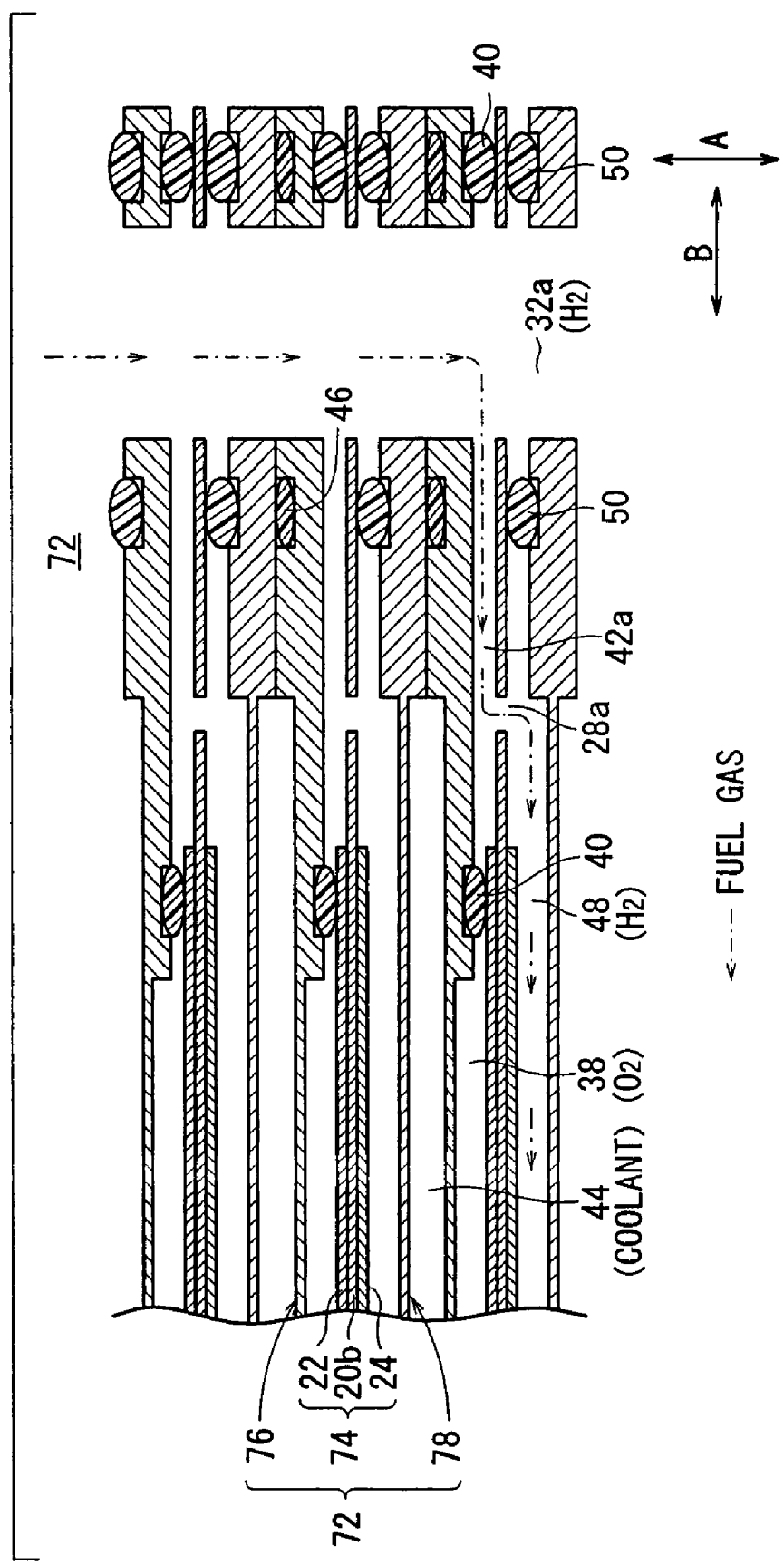
FIG. 12 is a cross sectional view showing the fuel cell taken along a line XII-XII in FIG. 11.
Figure 13:
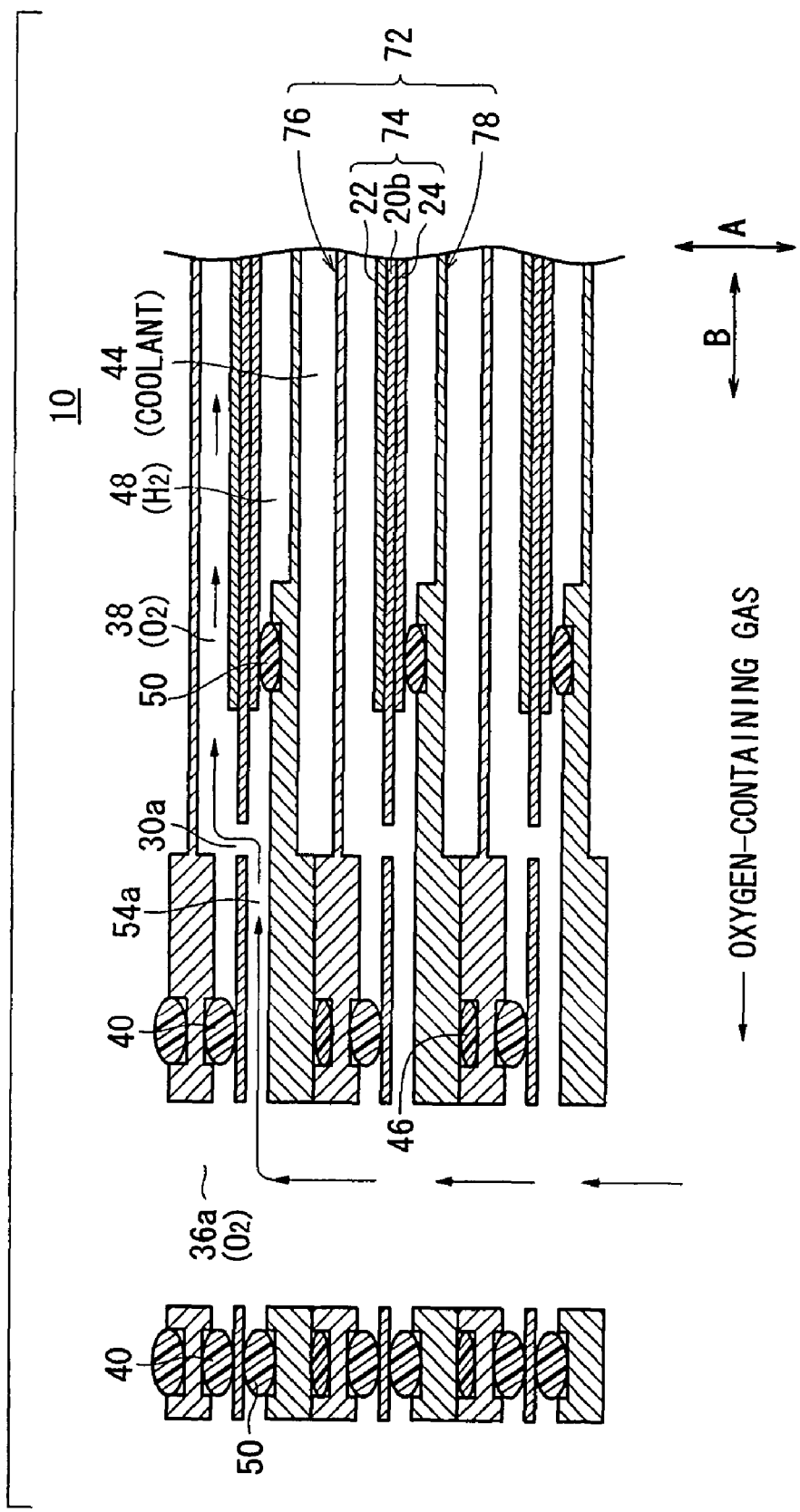
FIG. 13 is a cross sectional view showing the fuel cell taken along a line XIII-XIII in FIG. 11.

FIG. 11 is an exploded perspective view showing a power generation cell 72 of a fuel cell 70 according to a sixth embodiment of the present invention. The fuel cell 70 is formed by stacking a plurality of the power generation cells 72. FIG. 12 is a cross sectional view showing the fuel cell 70 taken along a line XII-XII in FIG. 11. FIG. 13 is a cross sectional view showing the fuel cell 70 taken along a line XIII-XIII in FIG. 11.

The power generation cell 72 is formed by sandwiching a membrane electrode assembly 74 between a first separator 76 and a second separator 78. The membrane electrode assembly 74 includes a cathode 22, and an anode 24, and a solid polymer electrolyte membrane 20b interposed between the cathode 22 and the anode 24. The solid polymer electrolyte membrane 20b, the first separator 76, and the second separator 78 have substantially the same size.

The solid polymer electrolyte membrane 20b has the first supply holes 28a, the first discharge holes 28b, the second supply holes 30a, and the second discharge holes 30b at positions outside the cathode 22 and the anode 24.

The first separator 76 includes a seal member 40 on a surface facing the membrane electrode assembly 74 around an oxygen-containing gas flow field 38. An inlet connection area 42a connected to the first supply holes 28a and an outlet connection area 42b connected to the first discharge holes 28b in the stacking direction are formed on the surface 76a by the seal member 40.

Figure 14:
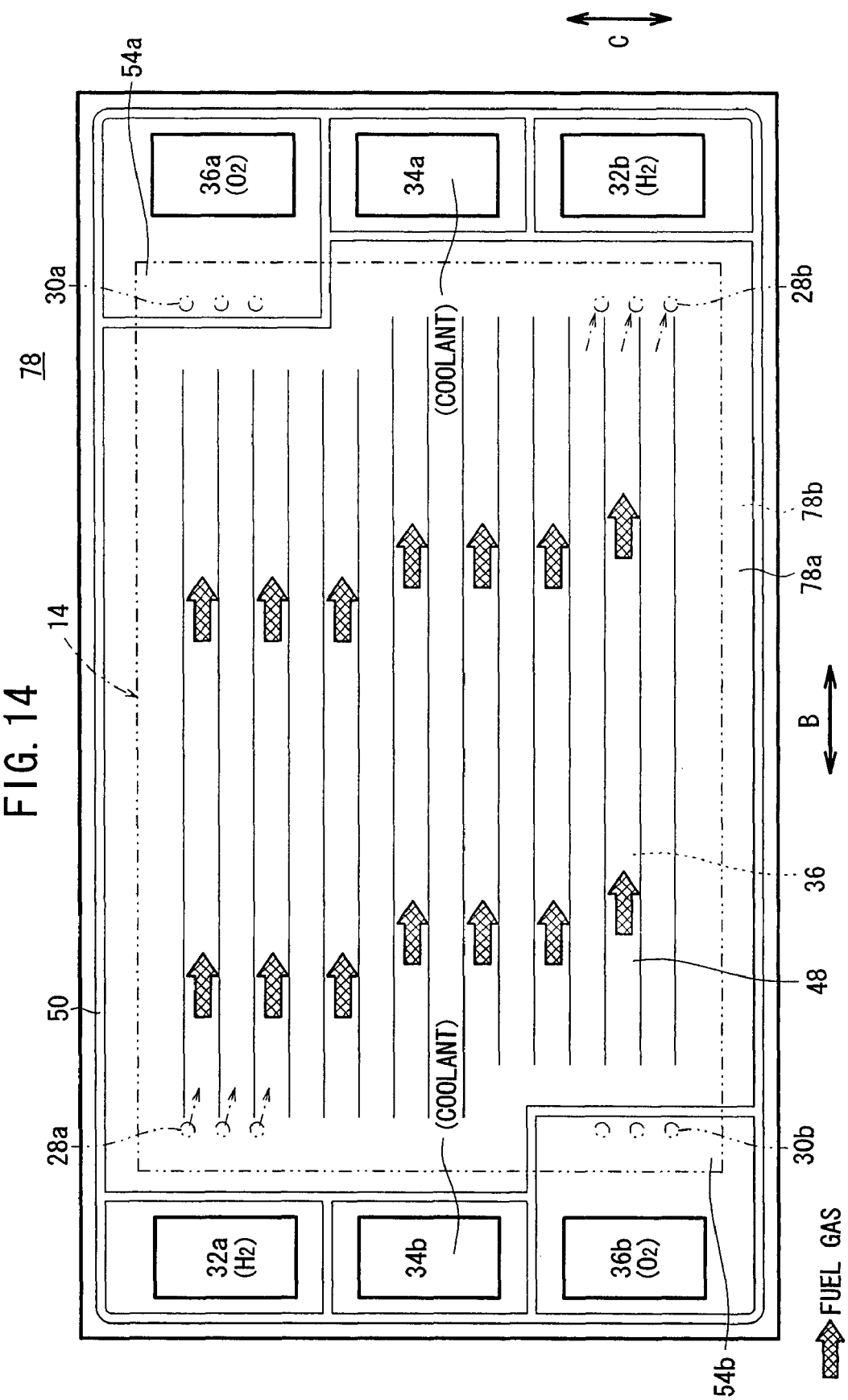
FIG. 14 is a front view showing a second separator of the fuel cell.

As shown in FIG. 14, the second separator 78 has a fuel gas flow field 48 on a surface 78a facing the membrane electrode assembly 74. The fuel gas flow field 48 is surrounded by a seal member 50. An inlet connection area 54a connected to the second supply holes 30a and an outlet connection area 54b connected to the second discharge holes 30b in the stacking direction are formed on the surface 78a by the seal member 50.

In the sixth embodiment, as in the case of the first embodiment, the fuel gas supplied to the fuel gas supply passage 32a flows into the inlet connection area 42a of the first separator 76, and flows through the first supply holes 28a connected to the inlet connection area 42a in the stacking direction. The fuel gas flows from the cathode 22 side to the anode 24 side, and then the fuel gas is supplied to the fuel gas flow field 48 of the second separator 78 (see FIG. 12).

The oxygen-containing gas supplied to the oxygen-containing gas supply passage 36a flows into the inlet connection area 54a of the second separator 78, and flows through the second supply holes 30a connected to the inlet connection area 54a in the stacking direction. The oxygen-containing gas flows from the anode 24 side to the cathode 22 side, and then the oxygen-containing gas is supplied to the oxygen-containing gas flow field 38 (see FIG. 13).

The six embodiment can be implemented simply by providing the first supply holes 28a, the first discharge holes 28b, the second supply holes 30a, and the second discharge holes 30b in the solid polymer electrolyte membrane 20b. No process of forming holes is required for the first separator 76 and the second separator 78. Thus, in the sixth embodiment, the same advantages as in the cases of the first to fifth embodiments can be obtained.

Figure 15:
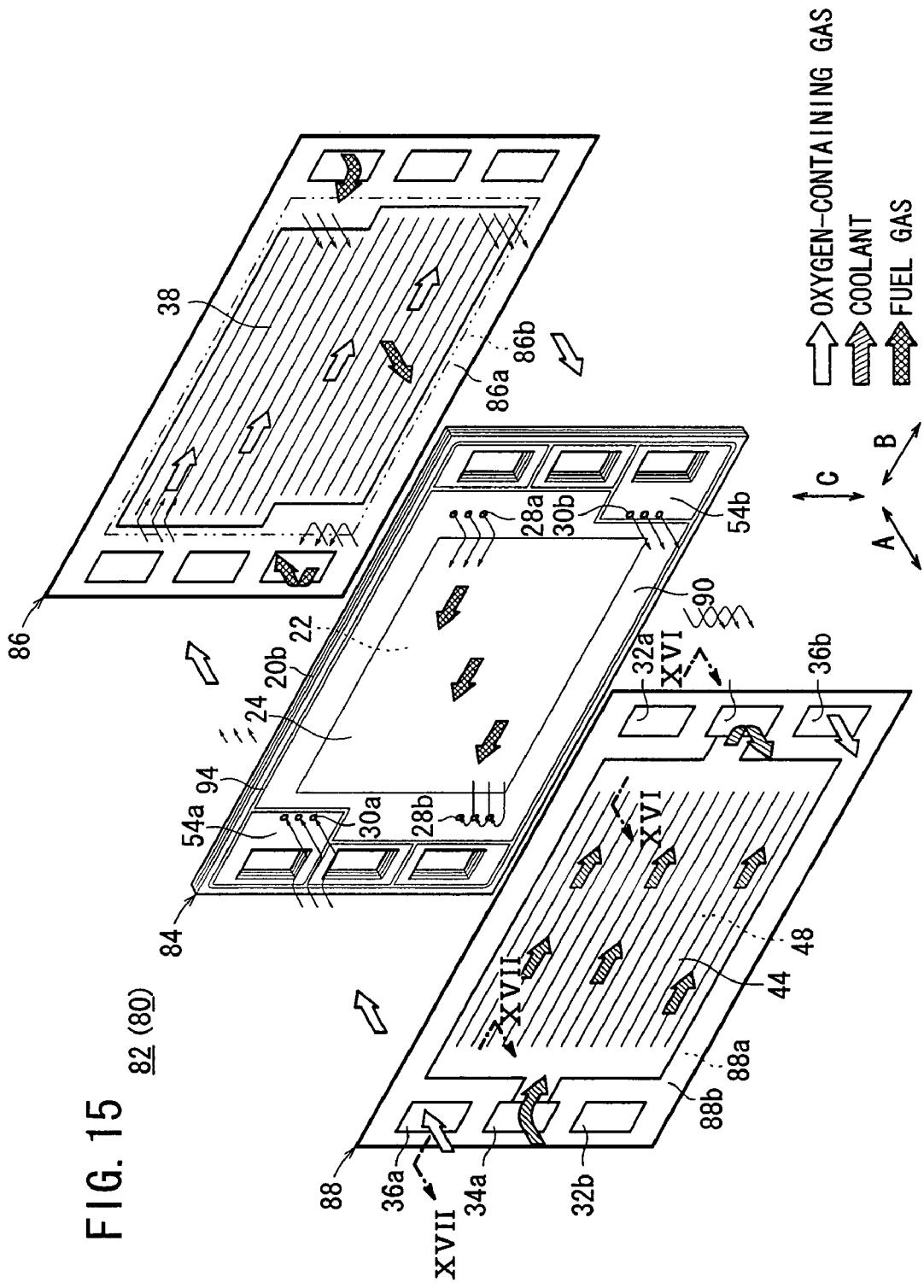
FIG. 15 is an exploded perspective view showing a power generation cell of a fuel cell according to a seventh embodiment of the present invention.
Figure 16:
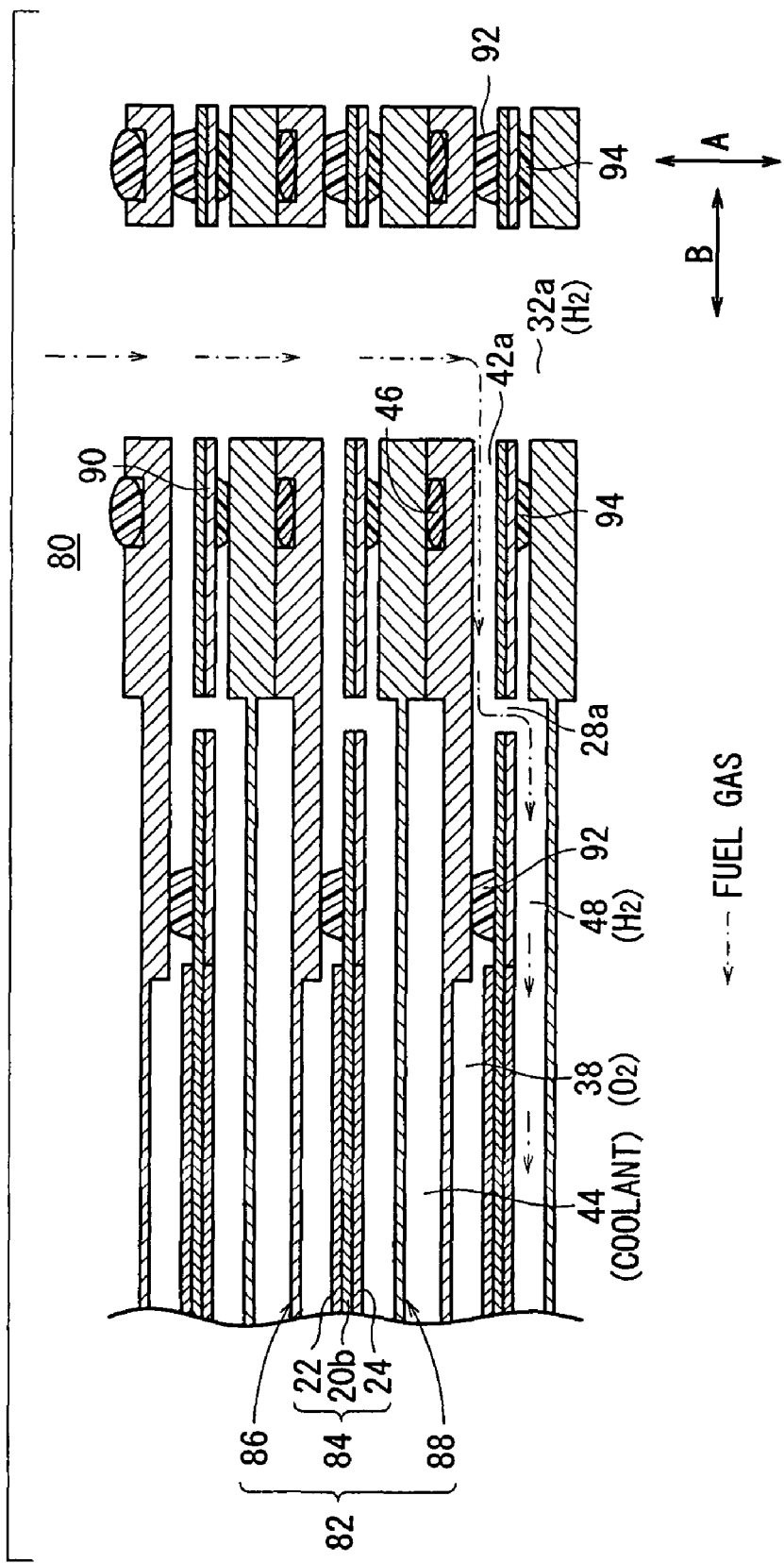
FIG. 16 is a cross sectional view showing the fuel cell taken along a line XVI-XVI in FIG. 15.
Figure 17:
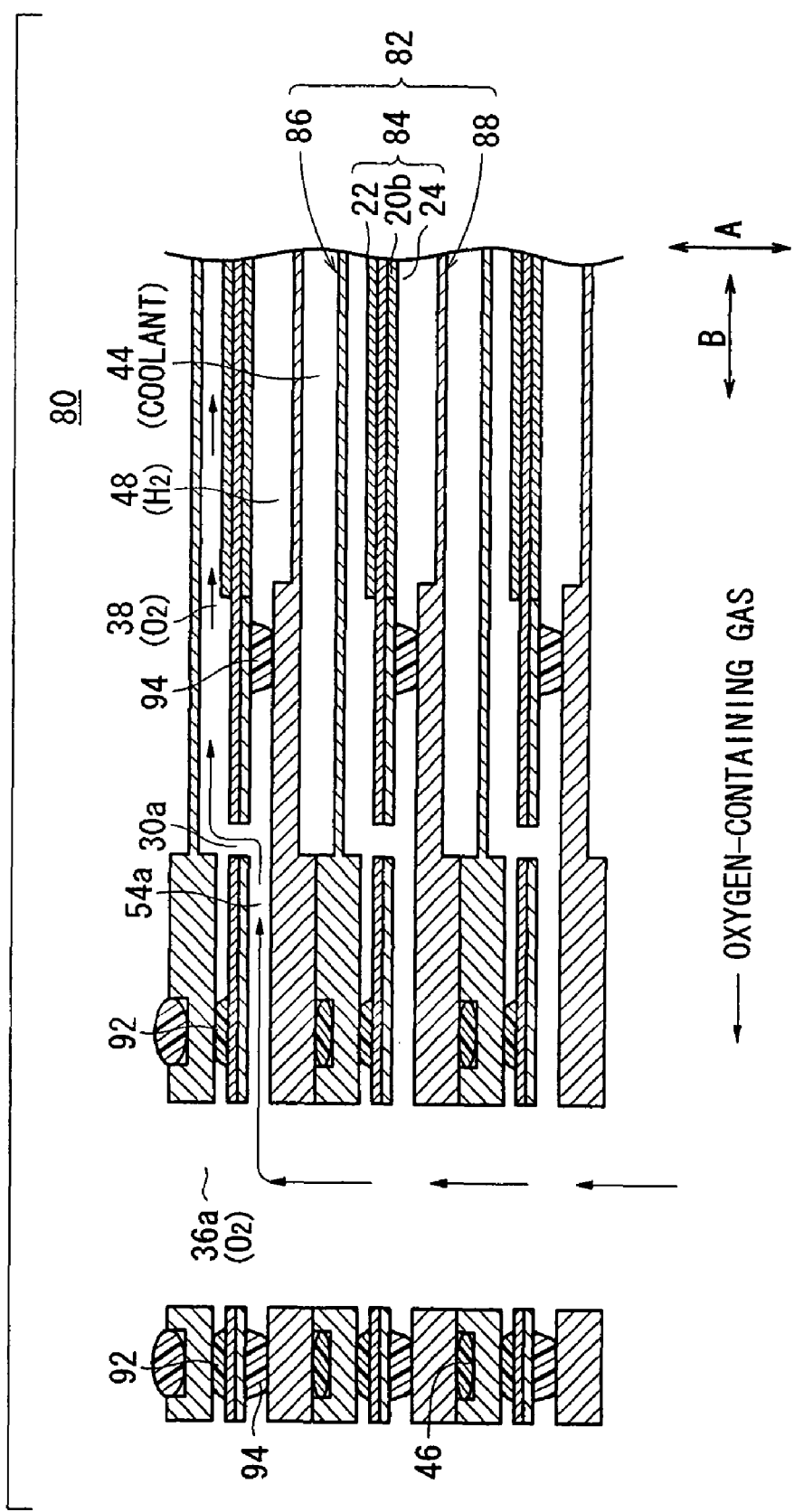
FIG. 17 is a cross sectional view showing the fuel cell taken along a line XVII-XVII in FIG. 15.

FIG. 15 is an exploded perspective view showing a power generation cell 82 of a fuel cell 80 according to a seventh embodiment of the present invention. FIG. 16 is a cross sectional view showing the fuel cell 80 taken along a line XVI-XVI in FIG. 15. FIG. 17 is a cross sectional view showing the fuel cell 80 taken along a line XVII-XVII in FIG. 15.

The power generation cell 82 is formed by sandwiching a membrane electrode assembly 84 between a first separator 86 and a second separator 88, and the membrane electrode assembly 84 includes a cathode 22, an anode 24, and a solid polymer electrolyte membrane 20b interposed between the cathode 22 and the anode 24. A resin frame 90 is formed on one surface of the solid polymer electrolyte membrane 20b around the anode 24 by resin impregnation.

The resin frame 90 may be formed directly on the solid polymer electrolyte membrane 20b by resin impregnation. Alternatively, the resin frame 90 may be formed by impregnating a carbon paper of the gas diffusion layer with resin.

Figure 18:
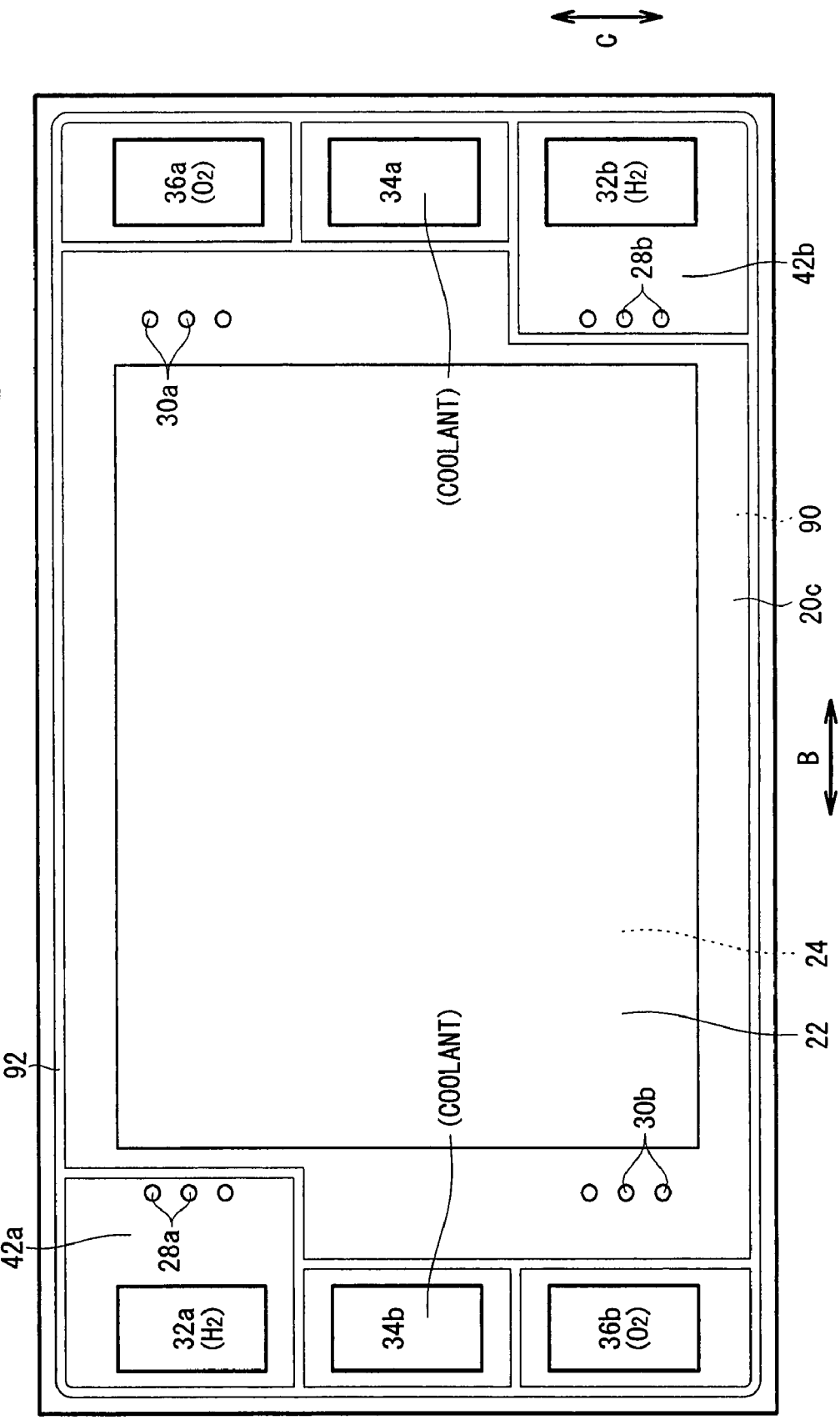
FIG. 18 is a front view showing a membrane electrode assembly of the fuel cell.

As shown in FIG. 18, a seal member 92 is formed on a surface of the cathode 22 of the membrane electrode assembly 84. The seal member 92 forms an inlet connection area 42a connecting the fuel gas supply passage 32a to the first supply holes 28a, and an outlet connection area 42b connecting the fuel gas discharge passage 32b to the first discharge holes 28b.

As shown in FIG. 15, a seal member 94 is formed on a surface of the membrane electrode assembly 84 on the side of the anode 24. The seal member 94 forms an inlet connection area 54a connecting the oxygen-containing gas supply passage 36a to the second supply holes 30a, and an outlet connection area 54b connecting the oxygen-containing gas discharge passage 36b to the second discharge holes 30b.

In the power generation cell 82, the fuel gas supplied to the fuel gas supply passage 32a flows into the inlet connection area 42a formed in the membrane electrode assembly 84. Then, the fuel gas flows through the first supply holes 28a toward the anode 24. The fuel gas is supplied to the fuel gas flow field 48 of the second separator 88 (see FIG. 16).

The oxygen-containing gas supplied to the oxygen-containing gas supply passage 36a flows into the inlet connection area 54a formed in the membrane electrode assembly 84. Then, the oxygen-containing gas flows through the second supply holes 30a toward the cathode 22. The oxygen-containing gas is supplied to the oxygen-containing gas flow field 38 of the first separator 86 (see FIG. 17).

Thus, in the seventh embodiment, the same advantages as in the cases of the first to sixth embodiments can be obtained. Further, the seal members 92, 94 are provided on both surfaces of the membrane electrode assembly 84. Thus, operation of forming the seal members is simplified significantly. It is possible to produce the first separator 86 and the second separator 88 further economically.

Figure 19:
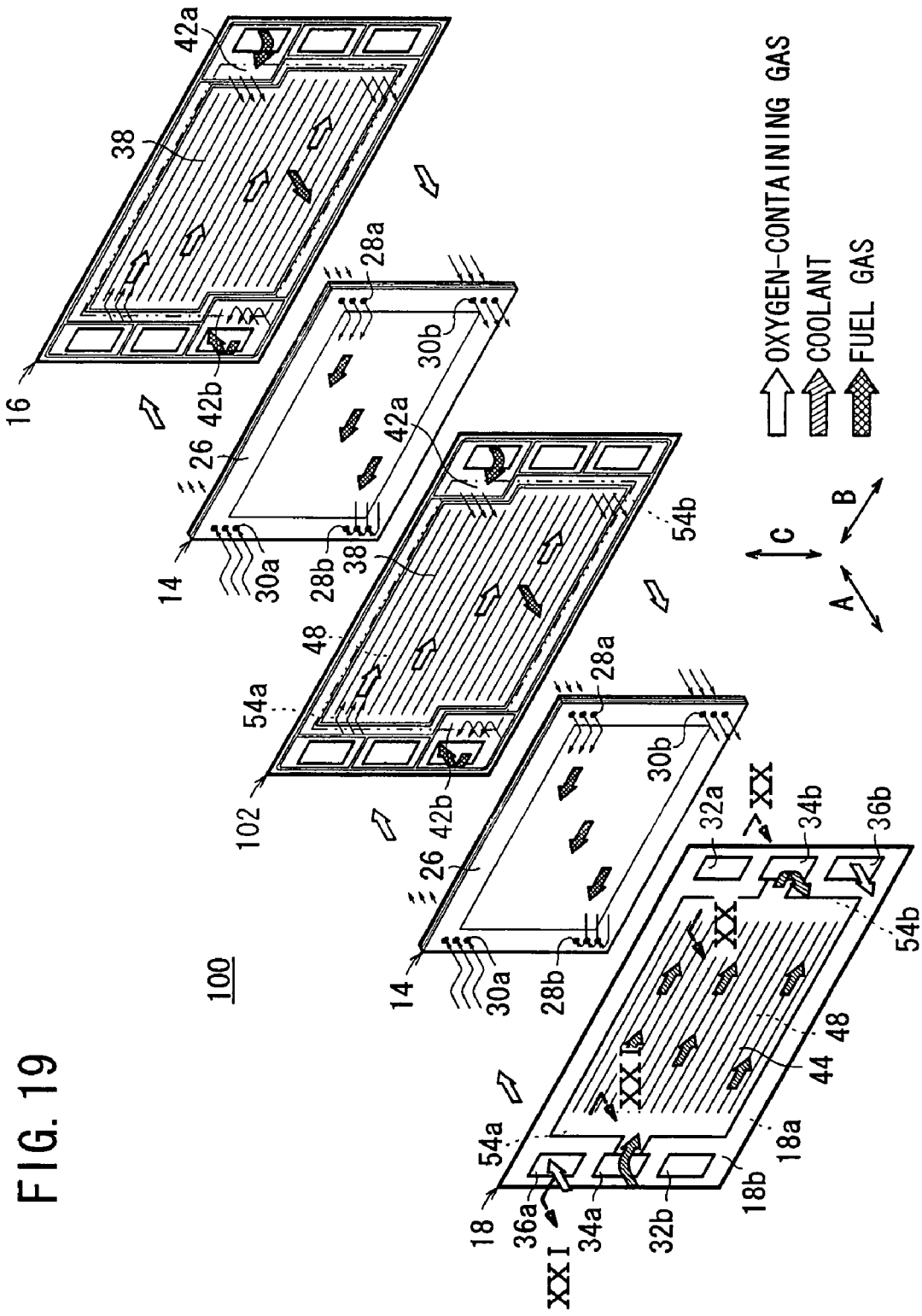
FIG. 19 is an exploded perspective view showing a fuel cell according to an eighth embodiment of the present invention.
Figure 20:
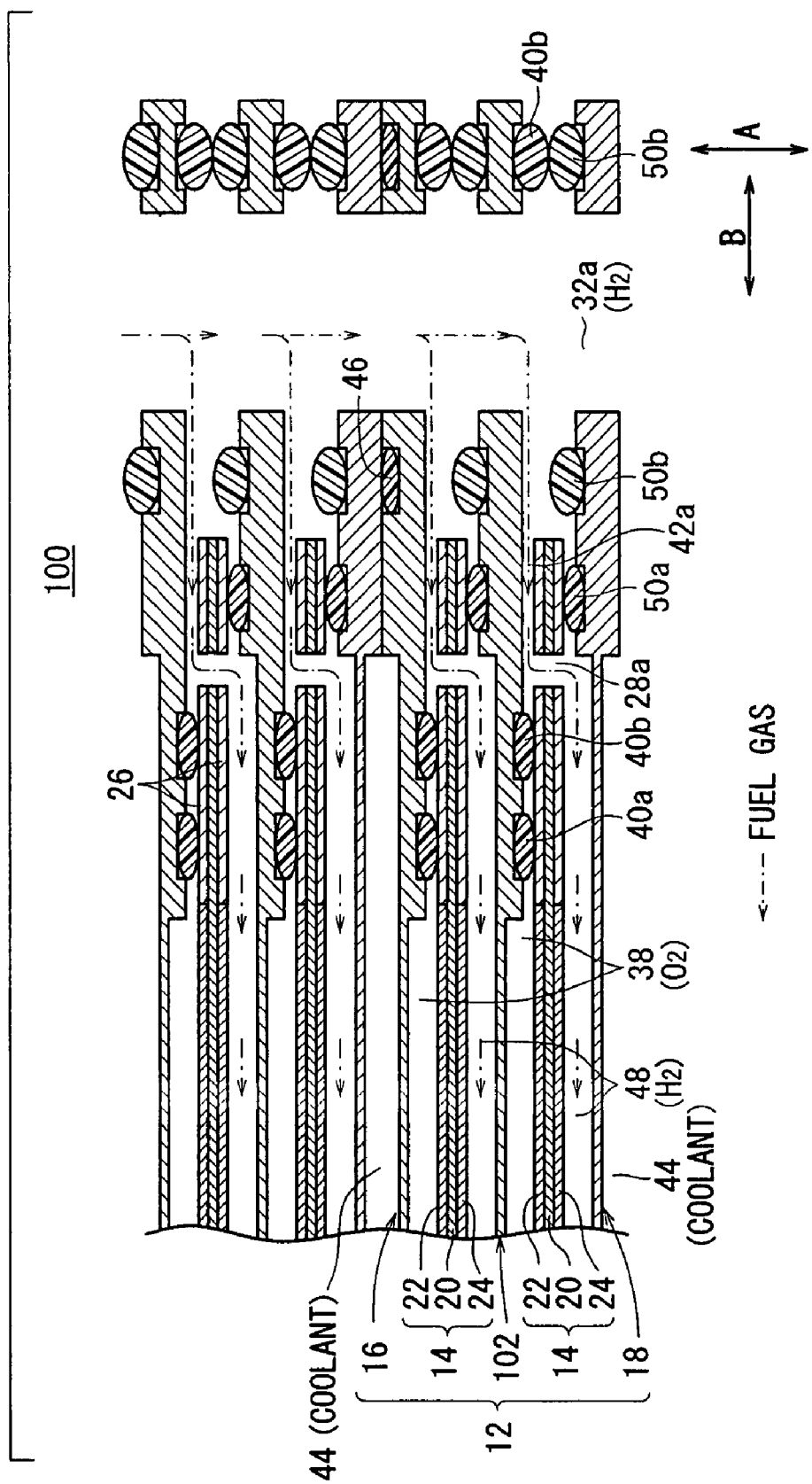
FIG. 20 is a cross sectional view showing the fuel cell taken along a line XX-XX in FIG. 19.
Figure 21:
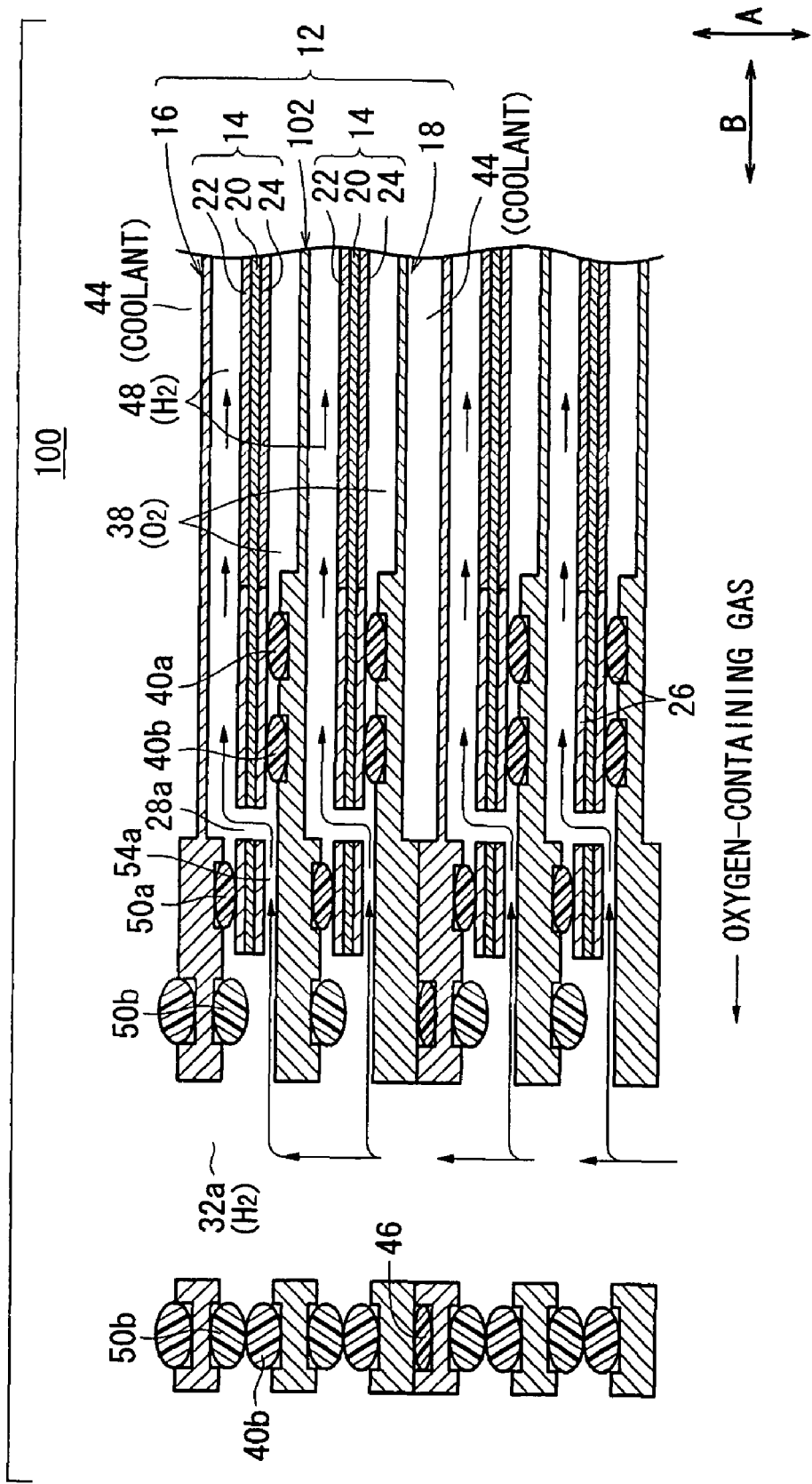
FIG. 21 is a cross sectional view showing the fuel cell taken along a line XXI-XXI in FIG. 19.
Figure 22:
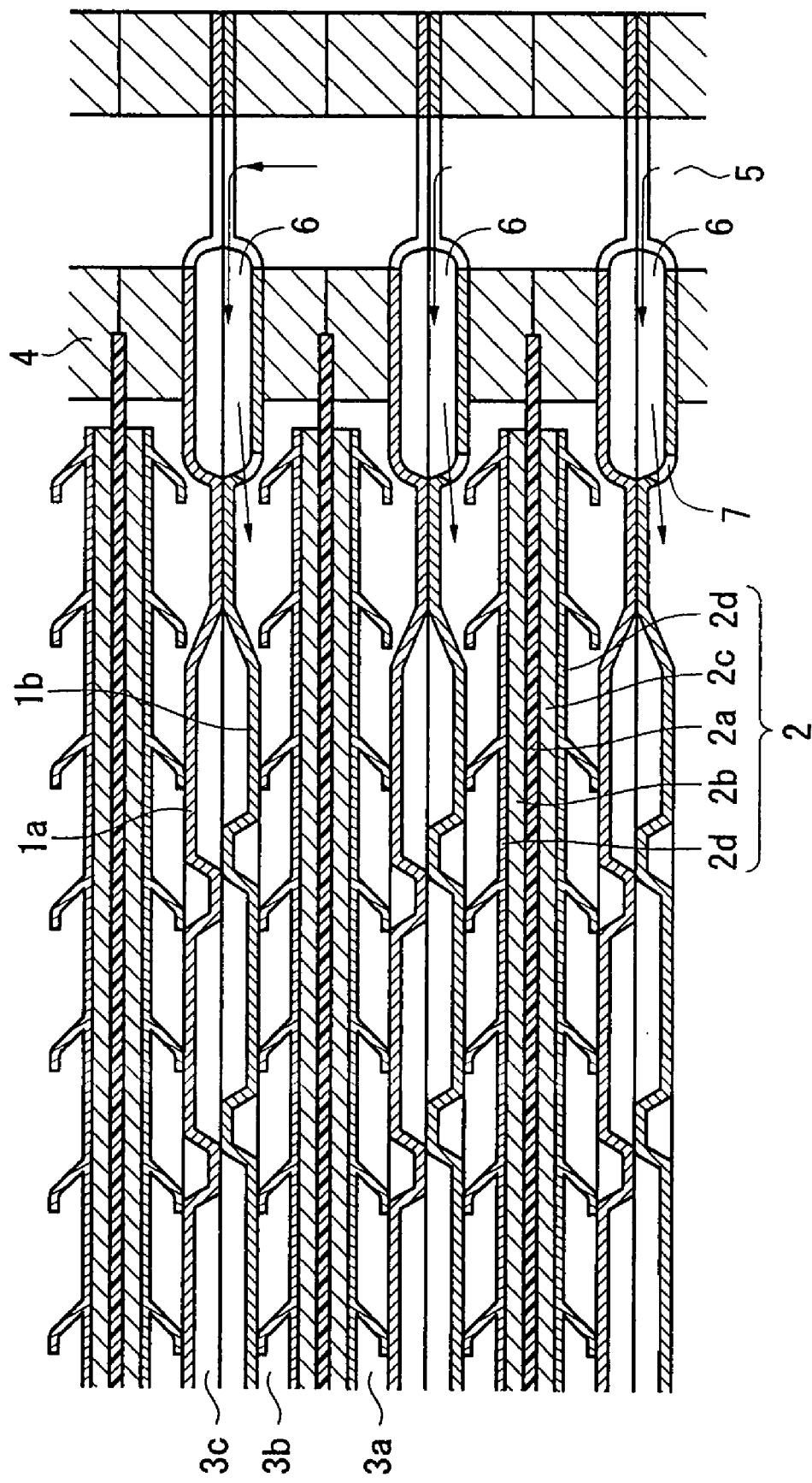
FIG. 22 is a view showing a conventional process control apparatus.

FIG. 19 is an exploded perspective view showing a fuel cell 100 according to an eighth embodiment of the present invention. FIG. 20 is a cross sectional view showing the fuel cell 100 taken along a line XX-XX in FIG. 19. FIG. 21 is a cross sectional view showing the fuel cell 100 taken along a line XXI-XXI in FIG. 19.

The fuel cell 100 is formed by stacking a third separator 102 between two membrane electrode assemblies 14, and stacking the membrane electrode assemblies 14 between a first separator 16 and a second separator 18. The third separator 102 has a fuel gas flow field 48 on a surface facing the first separator 16, and has an oxygen-containing gas flow field 38 on a surface facing the second separator 18.

The fuel cell 100 comprises a unit of the first separator 16, the second separator 18, the third separator 102, and the two membrane electrode assemblies 14 stacked in the direction indicated by the arrow A. In the fuel cell 100, two membrane electrode assemblies 14 are provided between two coolant flow fields 44. The fuel cell 100 has so called skip cooling structure.

In the fuel cell 100, the fuel gas is supplied to the fuel gas supply passage 32a, and flows into the inlet connection area 42a of the first separator 16 and the inlet connection area 42a of the third separator 102. The fuel gas flows through the first supply holes 28a of the membrane electrode assemblies 14, and the fuel gas is supplied to the fuel gas flow fields 48 of the third separator 102 and the second separator 18.

The oxygen-containing gas is supplied to the oxygen-containing gas supply passage 36a, and flows into the inlet connection area 54a of the second separator 18 and the inlet connection area 54a of the third separator 102. The oxygen-containing gas flows through the second supply holes 30a of the membrane electrode assemblies 14, and the oxygen-containing gas is supplied to the oxygen-containing gas flow fields 38 of the third separator 102 and the first separator 16.

Thus, in the eighth embodiment, the same advantages as in the cases of the first to seventh embodiments can be obtained. Further, the number of the coolant flow fields 44 is reduced by skipping. Accordingly, the overall size of the fuel cell 100 is reduced easily.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising an electrolyte electrode assembly and a pair of separators sandwiching said electrolyte electrode assembly, said electrolyte electrode assembly including a pair of electrodes, and an electrolyte interposed between said electrodes, a reactant gas flow field extending along an electrode surface between said electrolyte electrode assembly and each of said separators, a reactant gas supply passage for flowing a reactant gas, extending through said separators in a stacking direction,
   wherein a hole extends through said electrolyte electrode assembly in the stacking direction for connecting said reactant gas supply passage and said reactant gas flow field,
   wherein one end of the hole formed on one surface of the electrolyte electrode assembly is connected to the reaction gas supply passage, and the other end of the hole formed on the other surface of the electrolyte electrode assembly is connected to the reaction gas flow field.

2. A fuel cell according to claim 1, wherein said hole is provided outside an electrode power generation area of said electrolyte electrode assembly.

3. A fuel cell according to claim 1, wherein a seal member is provided between said electrolyte electrode assembly and said separator; and
   said seal member surrounds said reactant gas supply passage and said hole to form a connection area for connecting said reactant gas supply passage and said hole.

4. A fuel cell according to claim 1, wherein said electrolyte electrode assembly has a resin frame, and said hole extends through said resin frame.

5. A fuel cell comprising an electrolyte electrode assembly and a first separator and a second separator sandwiching said electrolyte electrode assembly, said electrolyte electrode assembly including an anode, a cathode, and an electrolyte interposed between said anode and said cathode, a fuel gas flow field extending along a surface of said anode, an oxygen-containing gas flow field extending along a surface of said cathode, a fuel gas passage for flowing the fuel gas extending through said first separator and said second separator in a stacking direction, an oxygen-containing gas passage for flowing the oxygen-containing gas extending through said first separator and said second separator in the stacking direction,
   wherein a first hole extends through said electrolyte electrode assembly in the stacking direction for connecting said fuel gas passage from a cathode side to said fuel gas flow field, and a second hole extends through said electrolyte electrode assembly in the stacking direction for connecting said oxygen-containing gas passage from an anode side to said oxygen-containing gas flow field,
   wherein one end of one of the first hole and the second hole formed on one surface of the electrolyte electrode assembly is connected to one of the fuel gas passage and the oxygen-containing gas passage, and the other end of one of the first hole and the second hole formed on the other surface of the electrolyte electrode assembly is connected to one of the fuel gas flow field and the oxygen-containing gas flow field.

6. A fuel cell according to claim 5, wherein said first hole and said second hole are provided outside an electrode power generation area of said electrolyte electrode assembly.

7. A fuel cell according to claim 5, wherein a first seal member and a second seal member are provided between said electrolyte electrode assembly and said first separator and said second separator;

said first seal member surrounds said fuel gas supply passage and said first hole to form a connection area for connecting said fuel gas supply passage and said first hole; and said second seal member surrounds said oxygen-containing gas supply passage and said second hole to form a connection area for connecting said oxygen-containing gas supply passage to said second hole.

8. A fuel cell according to claim 5, wherein said electrolyte electrode assembly has a resin frame, and said first hole and second hole extend through said resin frame.

9. A fuel cell according to claim 1, wherein when the fuel cell stack is assembled, the hole is positioned inwardly and separately from the reactant supply passages of the separators.

* * * * *